(12) United States Patent
Shinohara et al.

(10) Patent No.: US 6,724,718 B1
(45) Date of Patent: Apr. 20, 2004

(54) NEAR FIELD OPTICAL HEAD AND METHOD FOR MANUFACTURING THEREOF

(75) Inventors: Yoko Shinohara, Chiba (JP); Takashi Niwa, Chiba (JP); Susumu Ichihara, Chiba (JP); Yasuyuki Mitsuoka, Chiba (JP); Manabu Oumi, Chiba (JP); Nobuyuki Kasama, Chiba (JP); Kenji Kato, Chiba (JP)

(73) Assignee: Seiko Instruments Inc., Chiba (JP)

( * ) Notice: Subject to any disclaimer, the term of this patent is extended or adjusted under 35 U.S.C. 154(b) by 253 days.

(21) Appl. No.: 09/806,649

(22) PCT Filed: Aug. 21, 2000

(86) PCT No.: PCT/JP00/05605

§ 371 (c)(1),
(2), (4) Date: May 7, 2001

(87) PCT Pub. No.: WO01/15151

PCT Pub. Date: Mar. 1, 2001

(30) Foreign Application Priority Data

Aug. 25, 1999 (JP) .......... 11-238062
Nov. 26, 1999 (JP) .......... 11-336062

(51) Int. Cl.$^7$ .......... G11B 17/32
(52) U.S. Cl. .......... 369/300
(58) Field of Search .......... 369/300, 112, 369/14; 359/188

Primary Examiner—Allen Cao
(74) Attorney, Agent, or Firm—Adams & Wilks

(57) ABSTRACT

A near-field optical head has a slider having a minute aperture for emitting near-field light. The minute aperture has a diameter equal to or less than a wavelength of visible light. The slider is supported by a suspension arm for exerting a load, receiving a floating force due to relative movement with a recording medium, and forming a gap between the slider and the recording medium through a balance between the load and the floating force. A light propagating medium has an output end for emitting light. An optical path length shortening structure shortens an optical path length between the output end of the light propagating medium and the minute aperture of the slider. A mirror is disposed over the slider for guiding light emitted from the light propagating medium to the minute aperture of the slider.

42 Claims, 15 Drawing Sheets

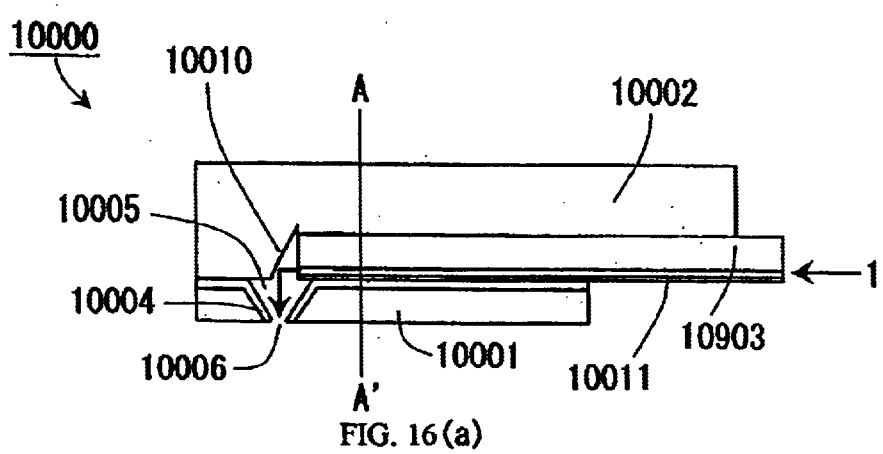
FIG. 16(a)
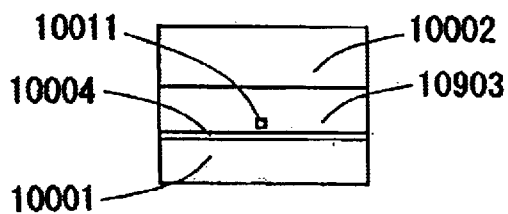
FIG. 16(b)
FIG. 17
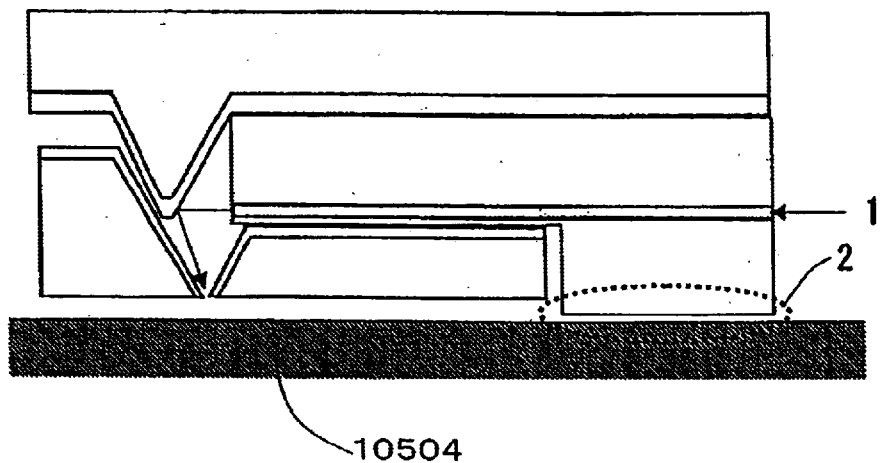

NEAR FIELD OPTICAL HEAD AND METHOD FOR MANUFACTURING THEREOF

BACKGROUND OF THE INVENTION

Field of the Invention

The present invention relates to a near-field optical head capable of reproducing and recording high-density information using near-field light. The present invention also relates to a method of manufacturing the near-field optical head.

BACKGROUND INFORMATION

In recent years, a rapid development on both aspects of the hardware and the software is accomplished in the field of the information appliances and the amount of information to deal with keeps on growing drastically therewith. With regard to the information storage apparatus as one of the information appliances (HDD in particular), a rapid shift to high-density recording goes along currently in such a way that the recording capacity per unit area in recording medium increases by 60 percent in annual rate. Therefore, a further miniaturization is desired in the size of one record unit (bit) recorded and reproduced on a recording medium.

For recording or reproducing in a minute region, an apparatus for observing the minute region of a nanometer order on the surface of the sample or an application of the scanning probe microscope represented by scanning tunnel microscope (STM) or an atomic force microscope (AFM) is becoming an object of public attention. SPM scans the probe having a sharpened tip over the surface of the sample, while observing an interaction such as the tunnel current generated between the probe and the surface of the sample or the force between the atoms so as to obtain an image of a certain resolution depending on the tip configuration of the probe.

For performing a high density recording of a recording medium, the method of recording and reproducing with the use of light in comparison with magnetism has an advantage of enabling a high-density recording along the tracking direction (radial direction of the recording medium). Thus, the application of the near-field optical microscope viewing by light is expected as a promising matter especially among SPM.

The near-field optical microscope deals with an interaction produced between the near-field light generated on the surface of an inspection sample and the probe as an observation subject so as to be able to observe the minute region of the sample surface. The principle of the inspection approach is described in detail hereinafter.

The near-field light is generated by irradiating propagating light onto the surface of the inspection sample. Since the near-field light is generated only in a highly adjacent area on the surface of the inspection sample, the sharpened tip of the probe is approached closely to the surface of the inspection sample within a distance equal to or less than $\mu$m so as to scatter the near-field light generated from the tip of the probe. The scattered light is guided through a small aperture of the tip of the probe and processed by a conventional detection process of a transmitted light. Thus, the limitation of the viewing resolution of the conventional optical microscope is broken through and so the observation of a minute region by light becomes possible. Furthermore, a light of great intensity is introduced into the probe toward the inspection sample to generate a near-field light of high energy density in the minute aperture of the probe. By means of this near-field light, a local modification of the construction or the properties of the sample surface is also made possible. As described above, a realization of optical memory recording with high-density is thought to be possible by means of the application of near-field optical microscope.

In the architecture of the optical memory recording apparatus using such a near-field light, the probe is the most important part because it has a minute aperture acting as a recording and reproducing optical head. As an example of a probe having a minute aperture, as for instance described in U.S. Pat. No. 5,294,790, a cantilever-type photoprobe is proposed comprising an aperture penetrating through a silicon substrate by means of semiconductor manufacturing technology of photolithography or the like, an insulation film formed on one side of the surface of the silicon substrate and a cone-shaped light waveguide layer formed on the insulation film in the opposite side of the aperture. In this cantilever-type photoprobe, an optical fiber is interposed into the aperture so that the light can be transmitted through the minute aperture part which is formed by coating a light waveguide layer with a metal film except for the tip portion. Consequently, it is made easy to manufacture the aperture part.

Furthermore, an application of the planar probe without sharpened tip like the above-mentioned probe is proposed (T. Yatsui et al., "Readout capability of a planar apertured probe for optical near-field memory", NFO-5, 115, Shirahama, Dec. 10, 1998). The planar probe is the one which is provided with an aperture of reverse pyramid structure on silicon substrate by means of anisotropic etching and in particular the vertex of the aperture is perforated with a diameter of several nm to form an aperture part. A plurality of such planar probes can be made simultaneously as a lump on a same substrate by semiconductor manufacturing technology, namely making an array of the planar probes is easy and in particular the planar probe has an advantage of utilizing as a suitable optical head for recording and reproducing the optical memory using near-field light. As an optical head using this planar probe, a head having a planar probe provided on the flying head used in a hard disk drive is proposed (Nikkei Electronics, Mar. 10, 1997 issue). The flying head is conventionally designed to fly by aerodynamic design keeping a spacing of 50–100 nm above the recording medium. With the use of this flying head, keeping the head and the recording medium in an extreme proximity (positional relationship) and forming a minute aperture in the flying head at the recording medium side, it becomes possible to generate near-field light. Therefore, high-density recording and reproduction by light is thought to be possible.

On realizing the optical information memory apparatus using near-field light, the utility value of the apparatus in itself is enhanced if the device in itself is made small and slim. For making the device small and slim, it is considered suitable to adopt a structure in which the light propagated in parallel with the recording medium is turned to a direction perpendicular to the medium and the aperture with the aid of optical components. However, with this structure, the head in itself becomes large and heavy due to the combination of optical components and results in a problem that the positioning accuracy and the response characteristics is deteriorated.

In addition, when a light is launched into the aperture by means of a light waveguide path such as an optical fiber, the intensity of the near-field light emitted from the aperture becomes small resulting in problems that the recording and reproducing rate is decreased and that the reliability of the information recorded and reproduced is deteriorated. As for this problem, since the light emitted from the light emitting edge of the light waveguide path is propagated spreading its width, and so the spot diameter of the light becomes large in accordance with the distance from the emitting edge. Then, the intensity of the light irradiated on the aperture is decreased and so is reduced the intensity of the near-field light for recording and reproducing. As a result, because the ratio of light intensity responsive to the information (S/N), a problem is generated that the recording and reproducing rate or the reliability of the information is deteriorated.

SUMMARY OF THE INVENTION

Therefore, a first near-field optical head according to the present invention comprises a slider supported by a load applying suspension arm for acquiring a flying force by means of a relative motion to a recording medium to make a spacing between the recording medium in accordance with a balance between the load and the flying force, a minute structure made on the slider in the recording medium side, a light propagating medium arranged on the slider in the opposite side of the recording medium and disposed substantially parallel with the suspension arm, a mirror for directing the light emitted from the light propagating medium arranged substantially above the minute structure to the minute structure, and a path shortening structure for shortening the path between the light emitting edge of the light propagating medium and the minute structure.

Therefore, according to the first near-field optical head related to the present invention, by placing the mirror in the vicinity of the minute structure by means of the optical path shortening structure and also by setting the position of the light emitting edge of the light propagating medium close to the minute structure, the distance between the light emitting edge of the light propagating medium and the minute structure can be shortened and also the spot diameter of the light from the light propagating medium can be reduced so that the intensity of the near-field light generated by the minute structure is increased. Therefore, a near-field optical head capable of high-density recording and reproducing can be obtained.

Further, in a second near-field optical head according to the present invention, a construction is adopted in which the minute structure is a minute aperture.

Therefore, according to the second near-field optical head related to the present invention, high-density recording and reproducing is made possible, because the spot diameter of the near-field light on the recording medium is reduced to approximately the same size as the minute aperture.

Further, in a third near-field optical head according to the present invention, a construction is adopted in which the optical path shortening structure is a groove formed in the vicinity of the minute structure and the light propagating medium is arranged inside the groove.

Therefore, according to the third near-field optical head related to the present invention, the distance between the light emitting edge of the light propagating medium and the minute structure can be shortened so that a near-field optical head capable of generating near-field light of great intensity can be obtained. Furthermore, because it is easy to fix the light propagation medium by means of forming a light propagation medium in the groove, a near-field optical head capable of generating a near-field light of stable intensity can be obtained.

Further, in a fourth near-field optical head according to the present invention, a mirror is arranged on and integrated with the substrate which is placed above the slider.

Therefore, according to the fourth near-field optical head related to the present invention, a stable optical system can be constructed and the intensity of the near-field light generated by the minute structure is made stable.

Further, in a fifth near-field optical head according to the present invention, a construction is adopted in which the mirror is formed in the light propagating medium.

Therefore, according to the fifth near-field optical head related to the present invention, as the mirror and light propagating medium each of which is the component of the near-field optical head can be made integrally, the adjustment of the optical axis of the mirror and the light propagating medium becomes unnecessary and so the adjustment of the optical axis is made easy. In addition, since the number of the components is decreased, the unit price of the head becomes cheap so as to enable a provision of cheap near-field optical head.

Further, in a sixth near-field optical head according to the present invention, a construction is adopted in which the mirror has a concave shape to provide a near-field optical head that concentrates light emitted from the light propagating medium. In addition, in a seventh near-field optical head according to the present invention, the head has a lens function to concentrate the light on the tip of the light propagating medium.

Therefore, according to the sixth and seventh near-field optical head, it is possible to increase the energy density of the light in the minute structure so that the intensity of the near-field light generated by the minute structure can be increased.

Further, in the eighth near-field optical head related to the present invention, a near-field optical head is characterized in that a mirror aligning mechanism is formed on the slider and/or the substrate provided with the mirror to set the mirror and the minute structure in position.

Therefore, according to the eighth near-field optical head, the optical adjustment to maximize the intensity of the near-field light generated by the minute structure is made easy.

Further, the ninth near-field optical head related to the present invention has a construction in which a groove or a protrusion for fixing the optical components for launching the light on the light propagating medium is formed on the mirror substrate.

Therefore, according to the ninth near-field optical head, the light is launched on the light propagating medium effectively so that the intensity of the near-field light generated by the minute structure becomes large.

Further, the tenth near-field optical head related to the present invention has a construction in which the light propagating medium is fixed or formed on the slider.

Therefore, according to the tenth near-field optical head, the position of the light propagating medium is made stable by means of fixing or forming the light propagating medium on the slider so that the intensity of the near-field light generated by the minute structure can be made stable.

Further, in the eleventh near-field optical head related to the present invention, a construction is adopted which is characterized in that the light propagating medium is fixed or formed on the substrate in the same side on which the mirror is formed.

Therefore, according to the eleventh near-field optical head, the position of the light propagating medium is made stable even if a slider having a small thickness is used. In addition, the use of a slider having a small thickness makes it possible to shorten the distance between the light propagating medium and the minute structure so that the intensity of the near-field light generated by the minute structure can be increased.

Further, the twelfth near-field optical head related to the present invention has a construction in which the light propagating medium is comprised such that the light incident part is fixed on the substrate and the light emitting part is fixed on the slider.

Therefore, according to the twelfth near-field optical head, the positioning of the groove or the protrusion for fixing the light incident edge of the light propagating medium and the components for light incident on the light propagating medium can be performed precisely and the light emitting edge of the light propagating medium can be arranged close to the minute structure so that the intensity of the near-field light generated by the minute structure can be increased to a greater extent.

Further, the thirteenth near-field optical head related to the present invention has a construction in which the light propagating medium is an optical fiber having a tip machined in a narrow shape by means of grinding thereof in parallel with the optical axis.

According to the construction, optical fiber with its tip sharpened makes it possible to arrange the light emitting edge of the optical fiber close to the mirror so that the spot diameter of the light emitted from the light emitting edge of the optical fiber in the minute structure can be reduced. Therefore, the intensity of the near-field light generated by the minute structure is increased.

Further, the fourteenth near-field optical head related to the present invention has a construction characterized in that the light propagating medium is a thin film waveguide.

Consequently, with the use of a thin film waveguide thinner and lighter than an optical fiber as the light propagating medium, the mass of the near-field optical head is reduced. Therefore, it becomes easy to improve the positioning accuracy or the positioning speed of the near-field optical head. In addition, by means of using the thin film waveguide as the light propagating medium, it becomes easy to make the near-field optical head in a thin shape and the apparatus can be constructed in more compact size.

Additionally, the first method for manufacturing the near-field optical head related to the present invention is a method for manufacturing the near-field optical head including a method for forming a mirror, a method for forming a slider and an assembling process of the mirror and the slider. The method for forming the mirror is processes including a forming process of the projection on the substrate, a forming process of the reflection coating on the projection and a forming process of the configuration. The method for forming the slider is processes including a forming process of the minute structure, a forming process of the optical path shortening structure, a forming process of the reflection coating and a forming process of the configuration. Lastly, the process of assembling the mirror and the slider is included in the first method of manufacturing the near-field optical head.

Therefore, according to the first method for manufacturing the near-field optical head, the near-field optical head related to the present invention can be manufactured easily. In addition, as the method for forming the mirror and the slider uses photolithography or micromachining technology, mirrors and sliders having uniform performances can be produced in a large quantity.

Further, the second method for manufacturing the near-field optical head related to the present invention is a method including a process of fixing or forming the light propagating medium in the method for manufacturing the near-field optical head.

Therefore, the light propagating medium is fixed on the substrate on which is formed the slider or the mirror so that the intensity of the light emitted to the minute structure is made stable resulting in that the intensity of the light emitted from the minute structure is made stable.

Further, the third method of manufacturing the near-field optical head related to the present invention is a method characterized in that a forming process of a thin film waveguide is included in the forming process of the mirror or the slider.

Therefore, the light propagating medium can be made by means of a photolithography process so that the method for manufacturing the near-field optical head becomes easy for mass production.

Further, the fourth method of manufacturing the near-field optical head related to the present invention is a method characterized in that the process of forming a groove or a protruding for fixing the optical components is included in the method for forming the mirror.

Therefore, the mirror can be positioned to facilitate the assembly thereof and the near-field optical head capable of generating a near-field light of great intensity with stability can be provided.

Further, the fifth method for manufacturing the near-field optical head related to the present invention is a method characterized in that the method includes a grinding process of the tip of the optical fiber in parallel with the optical axis so as to sharpen the tip of the optical fiber.

Therefore, it is easy to arrange the tip of the optical fiber close to the mirror so as to provide a near-field optical head generating a near-field light of great intensity.

Further, the sixth method of manufacturing the near-field optical head related to the present invention is a method characterized in that the method includes a process of diagonal machining of the tip of the optical fiber to form a reflection coating on the diagonally machined surface thereof.

Therefore, the mirror and the light propagating medium can be made integrally and its manufacturing process can be simplified while the number of the components can be reduced so that a cheap near-field optical head with a uniform performance and less faulty components can be provided.

Further, the seventh method of manufacturing the near-field optical head related to the present invention is a method characterized in that the method includes a machining process of the tip of the optical fiber in a lens shape for concentrating the emitted light from the optical fiber onto the minute structure.

Therefore, the spot diameter of the emitted light from the optical fiber on the minute structure is reduced so that a near-field optical head generating near-field light of great intensity from the minute structure can be provided.

In addition, the fifteenth near-field optical head related to the present invention comprises a light propagating medium, a mirror for reflecting the light emitted from the light propagating medium, a minute structure arranged along the propagating direction of the light reflected back by the mirror, characterized in that the light propagating medium, the minute structure and the mirror are integrally supported by a load applying suspension arm to compose a part of a slider that makes a spacing between the recording medium and the minute structure in accordance with a balance between the load and the flying force acquired by means of the relative motion to the recording medium.

Therefore, the light propagating medium can be arranged at any given position along the thickness direction of the slider according to the condition of the emitted light from the light propagating medium so that the intensity of the light incident on the minute structure and the light emitted from the minute structure can be increased.

Further, the sixteenth near-field optical head related to the present invention is characterized in that the core part for transmitting light in the light propagating medium is arranged at a position biased toward the recording medium.

Therefore, the distance between the light emitting edge of the light propagating medium (the position of the core part in the end face of the light propagating medium) and the recording medium can be shortened further and the intensity of the light irradiated upon the recording medium can be increased.

Further, the seventeenth near-field Optical head related to the present invention is characterized in that the light propagating medium composes a part of a slider and at the same time at least a part of a suspension arm.

Therefore, losses due to the connection between the light propagating medium composing the slider and other light propagating medium for the light incident on the former light propagating medium is eliminated so that the light transmission efficiency is improved and the intensity of the light emitted the light propagating medium becomes large. Therefore, the intensity of the near-field light generated by the minute structure can be increased.

Further, the eighteenth near-field optical head related to the present invention is characterized in that the substrate provided or mounted with the mirror is constructed such that the mirror composes a part of a slider and at the same time the substrate composes at least a part of a suspension arm.

Therefore, the substrate provided or mounted with the mirror has a large area where the light propagating medium can be formed and so the restriction on the construction of the light propagating medium becomes small. As a result, the intensity of the propagated light can be transmitted in a stable and highly effective condition and by extension the intensity of the near-field light generated by the minute structure can be increased.

BRIEF DESCRIPTION OF THE DRAWINGS

FIG. 16(*a*) is a sectional view of a near-field optical head according to the tenth embodiment of the present invention and FIG. 16(*b*) is a cross-sectional view taken along line 16(*b*)–16(*b*)' in FIG. 16(*a*).

FIG. 17 is a perspective view showing a slider part and a mirror part of the near-field optical head according to the tenth embodiment of the present invention.

DETAILED DESCRIPTION OF THE PREFERRED EMBODIMENTS

The near-field optical head and the method for manufacturing thereof related to the present invention is explained in detail with reference to the accompanied drawings hereinafter.

First Embodiment

Figure 1A:
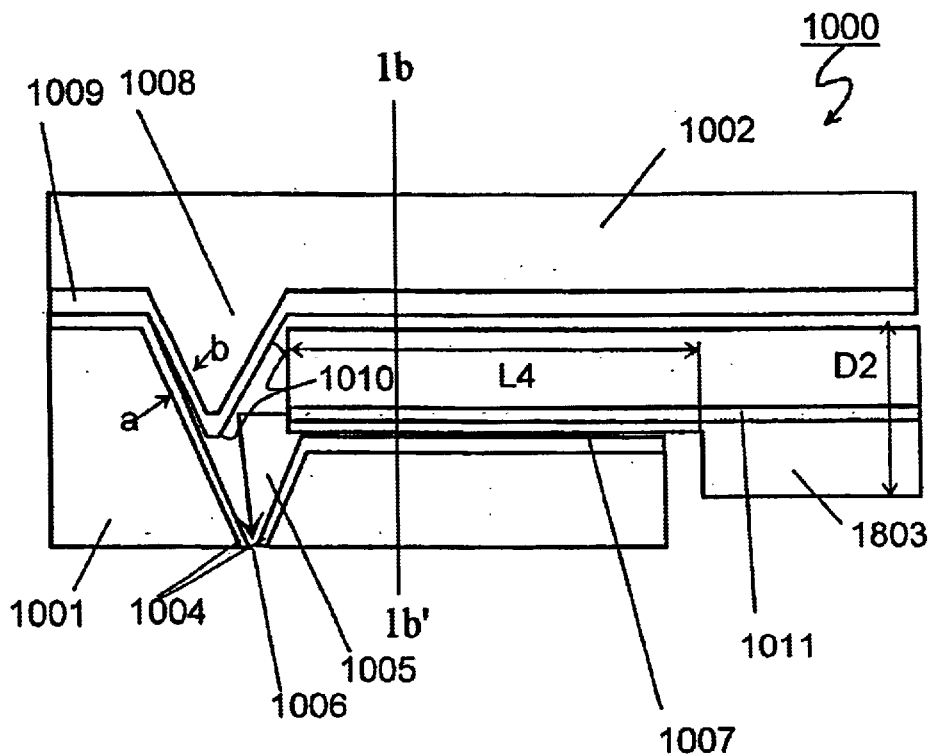
FIG. 1(*a*) is a partial sectional view showing a near-field optical head according to the first embodiment of the present invention and FIG. 1(*b*) is a cross-sectional view taken along line 1(*b*)–1 (*b*)' in FIG. 1(*a*).
Figure 1B:
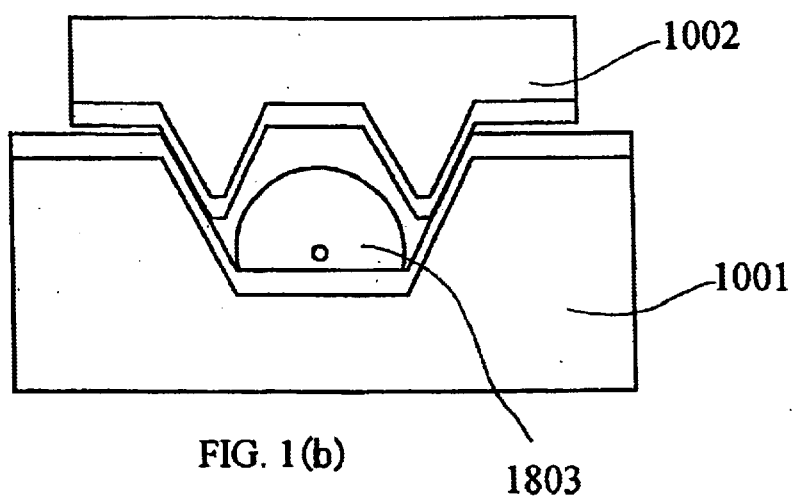
Figure 2A:
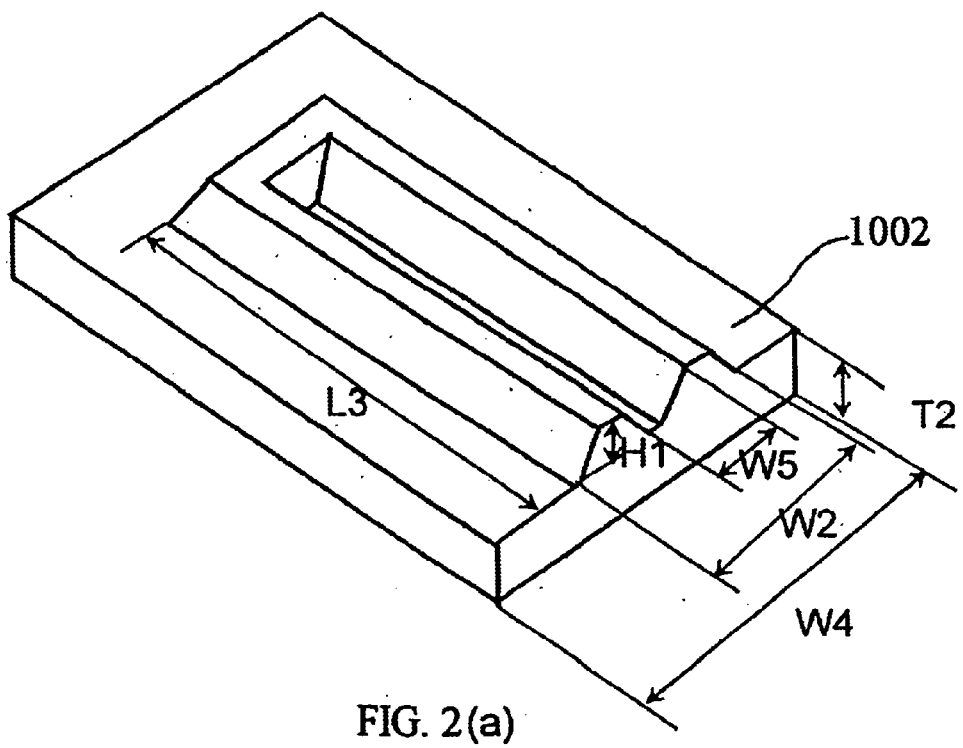
FIGS. 2(*a*) and 2(*b*) are perspective views showing a slider part and a mirror part, respectively of the near-field optical head according to the first embodiment of the present invention.
Figure 2B:
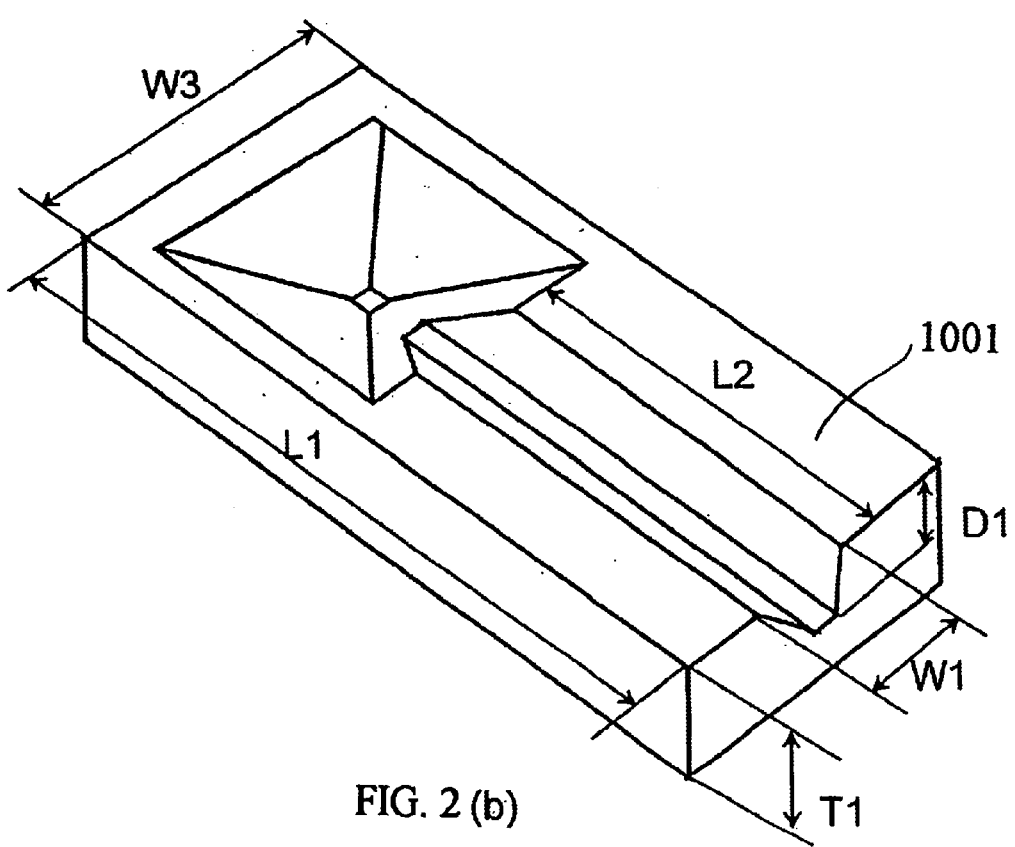

FIG. 1 is a construction view showing a near-field optical head 1000 according to the first embodiment of the present invention. FIG. 1(*a*) is a sectional drawing of the near-field optical head 1000 and FIG. 1(*b*) is a sectional drawing of the near-field optical head 1000 taken along line 1*b*–1*b*' in FIG. 1*a*. The near-field optical head 1000 comprises a slider part 1001, a mirror part 1002 and a light propagating body, such as an optical fiber 1803, the tip of which is partly ground in parallel with the optical axis. FIG. 2(*a*) and FIG. 2(*b*) are perspective views showing the slider part 1001 and the mirror part 1002, respectively, with the reflection coating removed.

In the slider part 1001, a reverse cone-shaped hole 1005 is formed, and the top of which is configured a minute aperture 1006 as a microstructure. Reflection coating 1004 is formed on the surface of the hole 1005 to concentrate the light incident in the hole 1005 to the minute aperture 1006 effectively. Additionally, the slider part 1001 is provided with a V-shaped groove 1007 having a width W1 and a plane is formed in the bottom part of the V-shaped groove.

On the other hand, the mirror part 1002 is formed with U-shaped protrusion 1008 having a width W2. The protrusion 1008 is provided with a reflection coating 1009 acting as a mirror 1010. By means of interposing the U-shaped protrusion of the mirror part 1002 in the V-shaped groove 1007 of the slider part 1001, the slider part 1001 and the mirror part 1002 are united to form an optical path shortening structure. By means of adjusting the width W1 of the V-shaped groove 1007 of the slider part 1001 and the width W2 of the U-shaped protrusion 1008 of the mirror part 1002 together and by joining the face shown by an arrow a in V-shaped groove of the slider part 1001 and the face shown by an arrow b in U-shaped protrusion of the mirror part 1002, the position of the mirror 1010 can be determined easily. Therefore, the width W1, W2 and the dimensions of the protrusion 1008 are defined such that the near-field light emitted from the minute aperture 1006 is maximized. The optical fiber 1803 is so constructed that its tip is ground in parallel with the optical axis up to the neighborhood of the core 1011 of the optical fiber 1803.

The optical fiber 1803 is interposed into the space defined by the V-shaped groove 1007 of the slider part 1001 and the inner surface of the U-shaped protrusion 1008 of the mirror part 1002. The optical fiber 1803 is fixed in the V-shaped groove 1007 of the slider part 1001. The light propagated through the optical fiber 1803 and emitted from the tip of the optical fiber 1803 is changed in its propagating direction by means of the mirror 1010 toward the minute aperture 1006. The optical fiber 1803 having a ground tip can arrange the light emitting edge of the optical fiber 1803 closer to the mirror 1010 than that of the optical fiber without a ground tip. In addition, the distance between the optical fiber 1803 and the minute aperture 1006 can be reduced also because the V-shaped groove 1007 is formed in the vicinity of the minute aperture 1006.

As for the slider part 1001, the thickness T1 is 200–500 $\mu$m, the length L1 is 1–5 mm and the width W3 is 1–5 mm. In addition, as for the V-shaped groove 1007, the width W1 is 150–500 $\mu$m, the length L2 is 500–4000 $\mu$m and the depth D1 is 100–400 $\mu$m the size of the minute aperture 1006 is 50–300 nm. The thickness of the reflection coating 1004 is 100–300 nm.

As for the mirror part 1002, the thickness T2 is 200–1000 $\mu$m, the length L2 is 1–5 mm and the width W4 is 1–5 mm. As for the protrusion 1008, the width W2 is 100–450 $\mu$m, the length L3 is 500–4000 $\mu$m and the height H1 is 100–400 $\mu$m. In addition, the thickness of the reflection coating 1009 is 50–300 nm.

The diameter D2 of the optical fiber 1803 is 125 $\mu$m. The depression depth D3 of the optical fiber tip is 50–60 $\mu$m and the length L4 of the depressed part is 500–5000 $\mu$m.

The material of the slider part 1001 and the mirror part 1002 is a dielectric such as silicon or quartz, or a metal such as stainless steel or copper. The material of the reflection coating 1004 and 1009 is a metal having a high reflection factor such as aluminum or gold, or a dielectric multilayer.

As described above, according to the near-field optical head 1000 related to the first embodiment, since the tip of the optical fiber 1803 is ground so that the tip of the optical fiber 1803 can be arranged close to the mirror 1010, the distance between the light emitting edge of the optical fiber 1803 and the minute aperture 1006 can be shortened and the spot diameter of the emitted light at the minute aperture 1006 can be reduced. Therefore, the intensity of the near-field light emitted from the minute aperture 1006 can be increased. In addition, as the optical head 1000 is constructed in a plane, its miniaturization is facilitated. Therefore, the mass of the optical head 1000 can be reduced so as to raise its positioning accuracy and at the same time the resonant frequency of the head positioning mechanism including the optical head can be raised so that the positioning speed is improved. In addition, by means of determining the dimensions of the V-shaped groove 1007 and the U-shaped protrusion such that the intensity of the near-field light emitted from the minute aperture 1006 is maximized, the positioning of the mirror 1010 is simplified and the adjustment of the optical axis becomes easy.

A description is made of the method for manufacturing the near-field optical head 1000 with reference to FIGS. 3(a)–(e) and 4(a)–4(g). FIGS. 3(a)–(e) show the method for manufacturing the mirror part 1002.

Figure 3A:
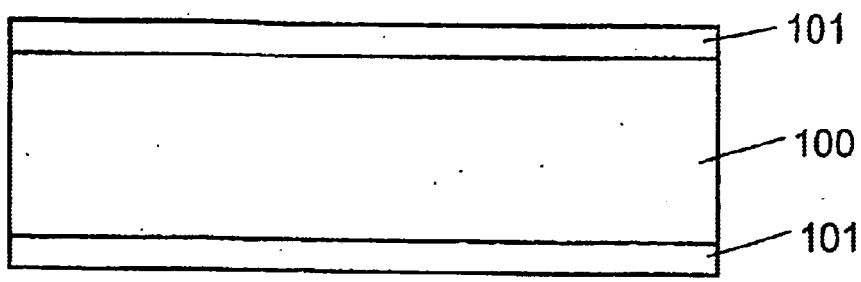
FIGS. 3(*a*)–3(*e*) show a method for manufacturing the mirror part of the near-field optical head according to the first embodiment of the present invention.

A substrate 100 such as silicon, quartz or stainless steel is shown in FIG. 3a. A masking 101 such as oxide film or nitride film is formed on the substrate 100. Incidentally, the upper side of the substrate in the drawing is referred to as a front side and the lower side is referred to as a rear side hereinafter.

Figure 3B:
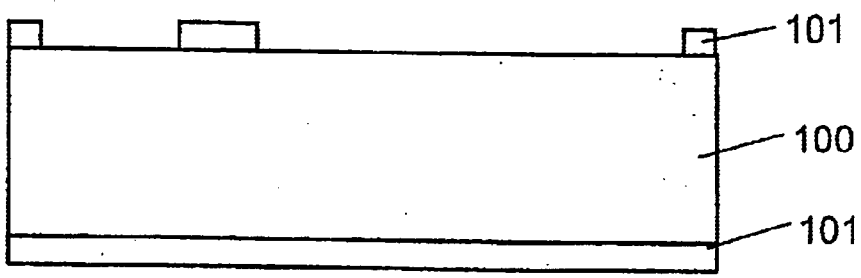

FIG. 3b shows a patterning process of the front side of the substrate 100, in which is illustrated a condition that the masking 101 has already been applied patterning. The masking 101 on the substrate 100 is applied a U-shaped patterning by means of a photolithography process.

Figure 3C:
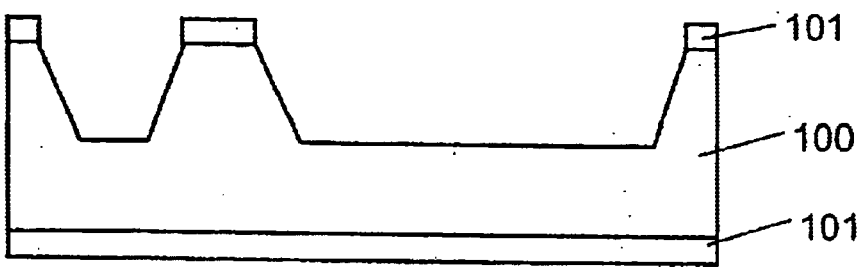

FIG. 3c shows a process of forming U-shaped protrusion, in which is illustrated a condition that the U-shaped protrusion has already been formed. In case of the substrate 100 being Silicon, U-shaped protrusion is formed by etching the substrate by means of anisotropic etching by potassium hydroxide (KOH) or tetramethylammonium hydroxide (TMAH).

Figure 3D:
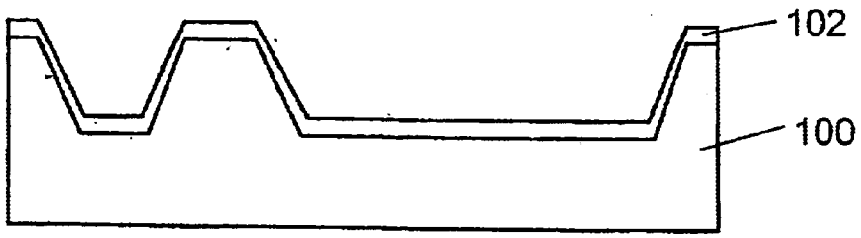

FIG. 3d shows an accumulating process of the reflection coating 102, in which is illustrated a condition that the reflection coating 102 has already been accumulated. After the U-shaped protrusion is formed, the masking 101 is removed by means of etching. Afterwards, the reflection coating 102 is accumulated on the substrate 100 by means of sputtering or vacuum deposition or the like.

Figure 3E:
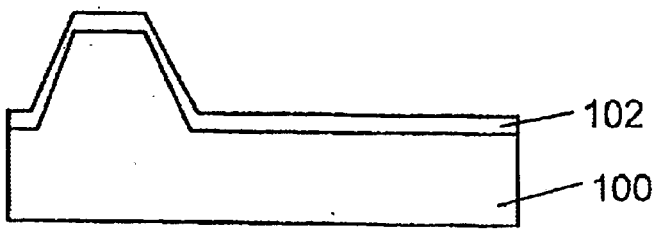

FIG. 3e shows the process of forming the configuration of the mirror part 1002, in which is illustrated a condition that the mirror part 1002 has already been finished. After the reflection coating 102 is accumulated, the mirror part 1002 is processed to have a desirable outside dimension means of an approach such as dicing or scribing.

FIGS. 4(a)–4(g) show a method for manufacturing the slider part 1001.

Figure 4A:
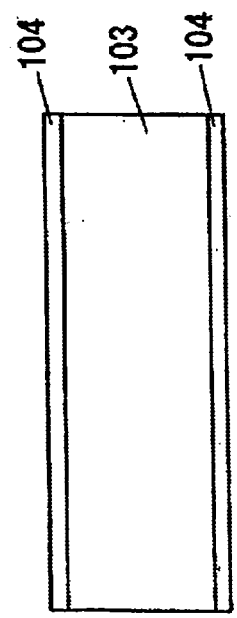
FIGS. 4(*a*)–4(*g*) show a method for manufacturing the slider part of the near-field optical head according to the first embodiment of the present invention.

FIG. 4a shows a substrate 103 such as silicon, quartz or stainless steel. A masking 104 such as oxide film or nitride film is formed on the substrate 103.

Figure 4B:
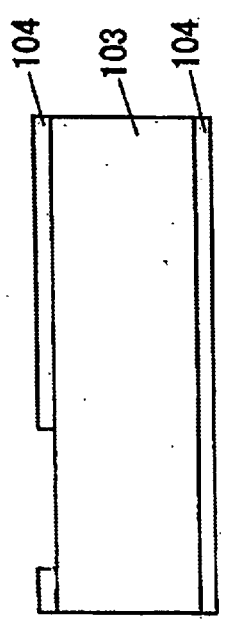

FIG. 4b shows a process for patterning the masking 104 on the substrate 103 to form a minute aperture therein, in which is illustrated a condition that the patterning of the masking 104 has already been performed. The patterning of the masking 104 on the substrate 103 is performed by a photolithography process.

Figure 4C:
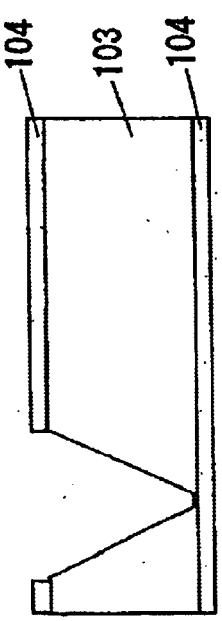

FIG. 4c shows a forming process of a minute aperture, in which is illustrated a condition that the minute aperture has already been formed. In case of the substrate .103 being made of silicon, the minute aperture is made by anisotropic etching by potassium hydroxide (KOH) or tetramethylammonium hydroxide (TMAH).

Figure 4D:
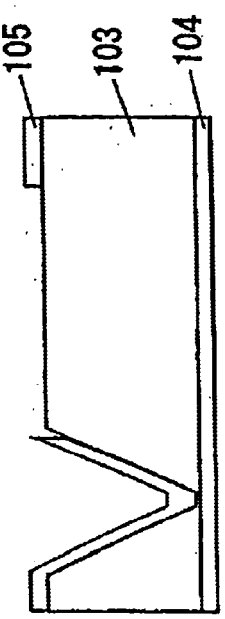

FIG. 4d shows a forming process of a masking 105 to form V-shaped groove, in which is illustrated a condition that the patterning of the masking 105 has already been performed. After the minute aperture is formed, the masking 104 on the substrate 103 is removed and the masking 105 is accumulated by gas phase synthesis method or spin coating or the like. The material of the masking 105 is an oxide film or a nitride film. Then, the masking 105 undergoes patterning of a masking geometry to form V-shaped groove by means of photolithography process.

Figure 4E:
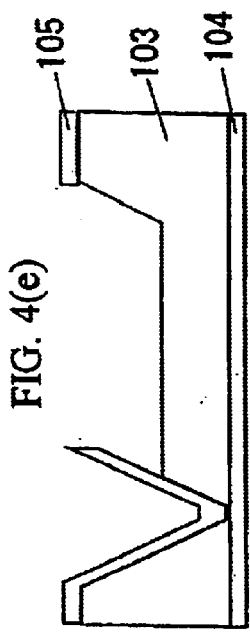

FIG. 4e shows a forming process of a V-shaped groove, in which is illustrated a condition that the V-shaped groove has already been formed. In case of the substrate 103 being silicon, the V-shaped groove is formed by anisotropic etching by KOH or TMAH.

Figure 4F:
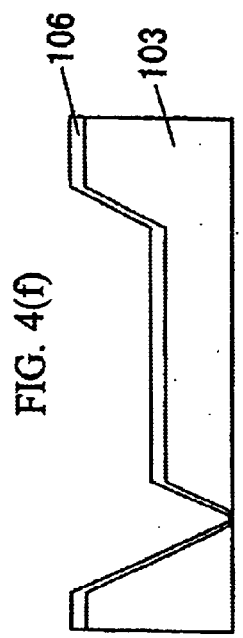

FIG. 4f shows a accumulating process of a reflection coating, in which is illustrated a condition that the reflection coating 106 has already been accumulated. After the V-shaped groove is formed, the masking 105 and the masking 104 on the rear face of the substrate 103 are removed by wet etching or by dry etching. Subsequently, the substrate 104 is accumulated with a metal having a high reflection factor and shading factor such as aluminum or gold by means of sputtering or vacuum deposition method. Then, taking the advantage of the simultaneous accumulation of the reflection coating 106 on the circumference of the minute aperture, the size of the reflection coating 106 is adjusted in its size.

Figure 4G:
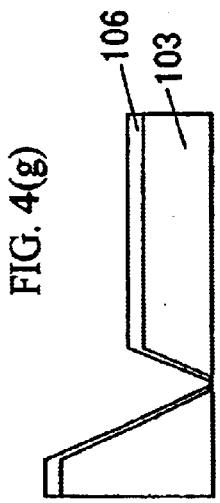

FIG. 4g shows a configuration process of the contour of a slider part 1001, in which is illustrated a condition that the slider part has already been finished. After the reflection coating 106 is accumulated, the slider part 1001 is processed into a desired outside dimension by means of an approach such as dicing or scribing.

An optical fiber 1803 having a ground tip is fixed on the slider part 1001 manufactured by the process as described above by means of adhesive or solid state junction etc. and then the protrusion of the mirror part 1002 is interposed in the V-shaped groove formed in the slider part 1001 to be fixed by means of adhesive or solid state junction thereby the near-field optical head 1000 being completed.

According to the method as described above, the near-field optical head 1000 shown in the first embodiment of the present invention can be made with ease and in a large quantity. In addition, as the mirror 1010 is positioned easily by inserting the U-shaped protrusion of the mirror part 1002 into the V-shaped groove 1007 of the slider part 1001, the assembly is easy and a near-field optical head 1000 capable of generating near-field light of great intensity with stability can be provided.

Figure 15:
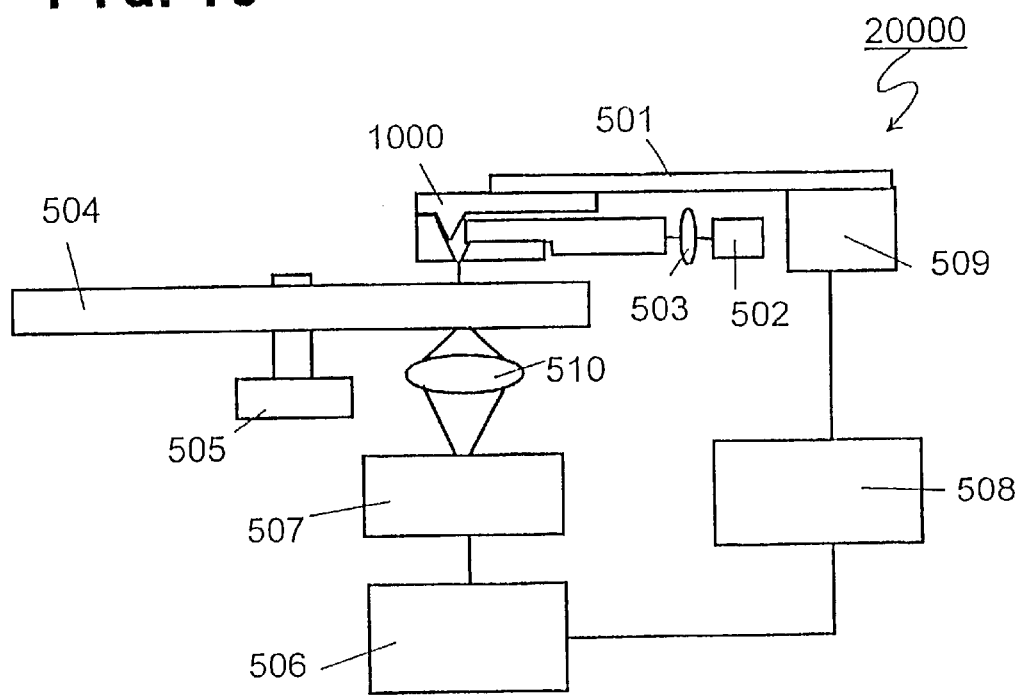
FIG. 15 is a construction view of an apparatus showing the optical recording/reproducing apparatus using near-field optical head.

FIG. 15 is a drawing showing a brief installation architecture of an optical recording/reproducing apparatus.

With reference to the above-mentioned near-field optical head 1000 arranged on a recording medium 504, recording and reproducing method of the information by means of near-field light emitted from the minute aperture is explained.

Near-field optical head 1000 flies in the spaced-apart position above the recording medium 504 by 10–100 nm by means of the interaction between the air flow on the recording medium 504 rotated by drive motor for recording medium 505 and the slider part 1001. Therefore, the position of the minute aperture 1006 formed in the slider 1001 is also in the position spaced apart from the recording medium 504 by 10–100 nm. The light emitted from the semiconductor laser 502 is condensed by the lens 503 to be directed into the near-field optical head 1000. The light directed into the near-field optical head 1000 is irradiated as near-field light from the minute aperture 1006 toward the recording medium 504. The recording medium 504, for example, is a phase change recording medium which is changed into an amorphousness condition or a crystal condition by means of a heat application and by which recording or reproducing may be done taking the advantages of the difference in the reflection factor or the transmission factor. In this case, for example, the information is recorded by means of irradiating a near-field light generated from the minute aperture onto the recording medium so as to change the region irradiated by the near-field light from the crystal condition into the amorphousness condition. As the distance between the minute aperture 1006 and the recording medium 504 is 10–100 nm, the size of the near-field light irradiated onto the recording medium from the minute aperture 1006 is substantially the same as the minute aperture, i.e. for example having a diameter of 100 nm. Therefore, according to the optical head 1000 shown in FIG. 1, recording with a high-density can be done easily.

On the other hand, for example, reproducing of the information is done as explained below. At first, the control circuit 506 of the optical head 1000 supplies a signal to the servo drive circuit 508 for moving the minute aperture to the desired information record position. The servo motor 509 that received the signal from the servo drive circuit 508 moves the optical head 1000 as a whole through the suspension 501 to move the minute aperture 1006 to the information record position. Then, near-field light is irradiated onto the record pit from the minute aperture, while concentrating the propagating light transmitted through the recording medium 504 to the photo detector 507 of the condenser lens system 510, thereby the information signal being provided. The provided information signal is sent to the control circuit 506 where the displacement between the minute aperture and the record pit is detected, for example, by comparing the signal strength. When there is a displacement between the position of minute aperture 1006 and the record pit, a signal for modifying the displacement is supplied to the servo circuit 508 from the control circuit 506 and the servo circuit 508 drives the servo motor 509. On the other hand, the propagating light transmitted through the recording medium 103 is concentrated on the photo detector as a signal including, for example, a difference of the transmission factor between the amorphousness condition and the crystal condition of the recording medium. This information about the difference of the transmission factor is detected as an information signal. The information signal obtained is transformed into a reproducing signal via a signal processing circuit not shown in the drawings.

As described above, according to the first embodiment, the optical head 1000 pushed by the suspension 501 keeps flying in the vicinity of the recording medium 504 by means of the optimally designed slider 1001 including the minute aperture 1006 and the near-field light having a small spot diameter can be irradiated on the recording medium from the minute aperture 1006 so that an optical head 1000 capable of high-density recording and reproducing cab be provided.

In addition, the optical head 1000 of the present invention, in which a mirror is provided on a thin substrate by forming a protrusion where a thin reflection coating is accumulated afterwards, has a light weight. Therefore, the optical head 1000 can be moved fast and precisely so that an optical head capable of tracking with high trackability can be provided.

In addition, it goes without saying that the record information on the recording medium can be extracted from the reflected light by means of forming a photo detector on the surface of the slider of the optical head 1000 or by means of arranging a photo detector on the recording medium. Furthermore, in case of acquiring the record information with the use of reflected light from the recording medium, by means of arranging an optical head and a photo detector on both sides of the recording medium, the recording density per one recording medium can be increased.

The optical head shown in the following embodiment can be used in the construction shown in FIG. 15 without exception.

Second Embodiment

Figure 5:
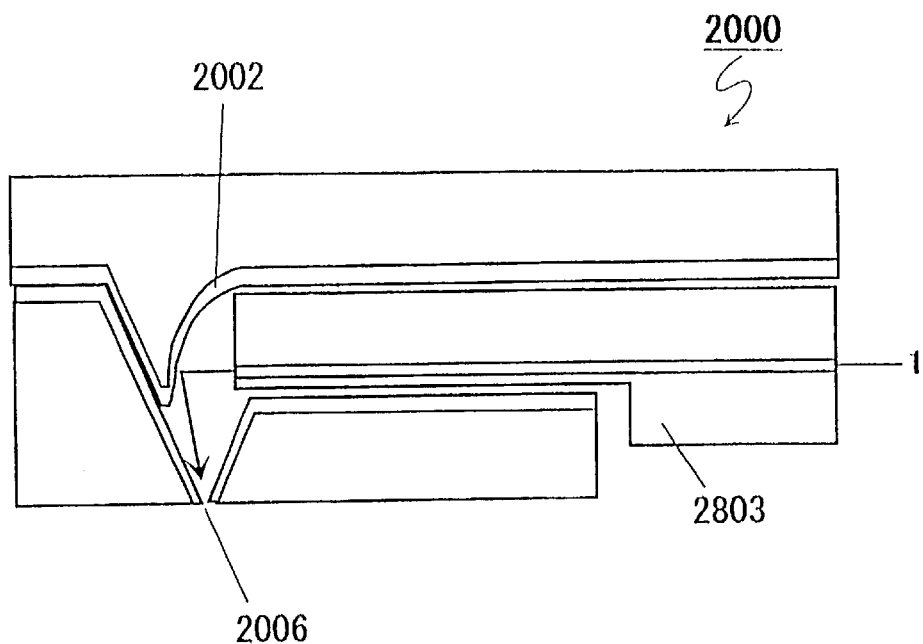
FIG. 5 is a construction view showing a near-field optical head according to the second embodiment of the present invention.

FIG. 5 is a construction view showing the near-field optical head 2000 related to the second embodiment of the present invention. The construction of the near-field optical head 2000 is approximately the same as that of the first embodiment of the present invention. Different point lies in the geometry of the mirror 2002. The mirror 2002 is consisted of a concave mirror. The light emitted from the optical fiber 2803 by the mirror 2002 is changed in its propagating direction toward the minute aperture 2006 and at the same time is concentrated on the minute aperture 2006. Therefore, according to the near-field optical head 2000, the near-field light emitted from the minute aperture 2006 has a greater intensity than that of the near-field optical head shown in the first embodiment.

Third Embodiment

Figure 6:
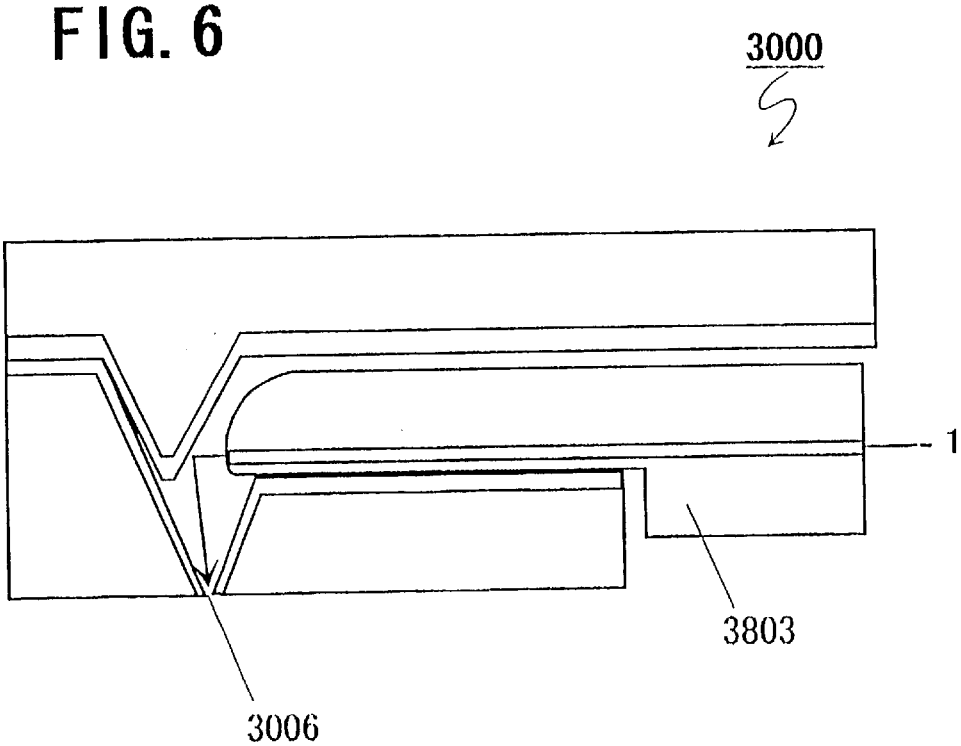
FIG. 6 is a construction view showing a near-field optical head according to the third embodiment of the present invention.

FIG. 6 is a construction view showing the near-field optical head 3000 related to the third embodiment of the present invention. The construction of the near-field optical head 3000 is approximately the same as the first embodiment of the present invention. The different point lies in that the tip of the optical fiber 3803 of the present invention is processed in a spherical shape.

Accordingly, the light emitted from the tip of the optical fiber propagates while concentrating itself toward the minute aperture 3006. Therefore, as for the near-field optical head 3000, the near-field light generated from the minute aperture 3006 has a greater intensity than the near-field optical head shown in the first embodiment.

Fourth Embodiment

Figure 7:
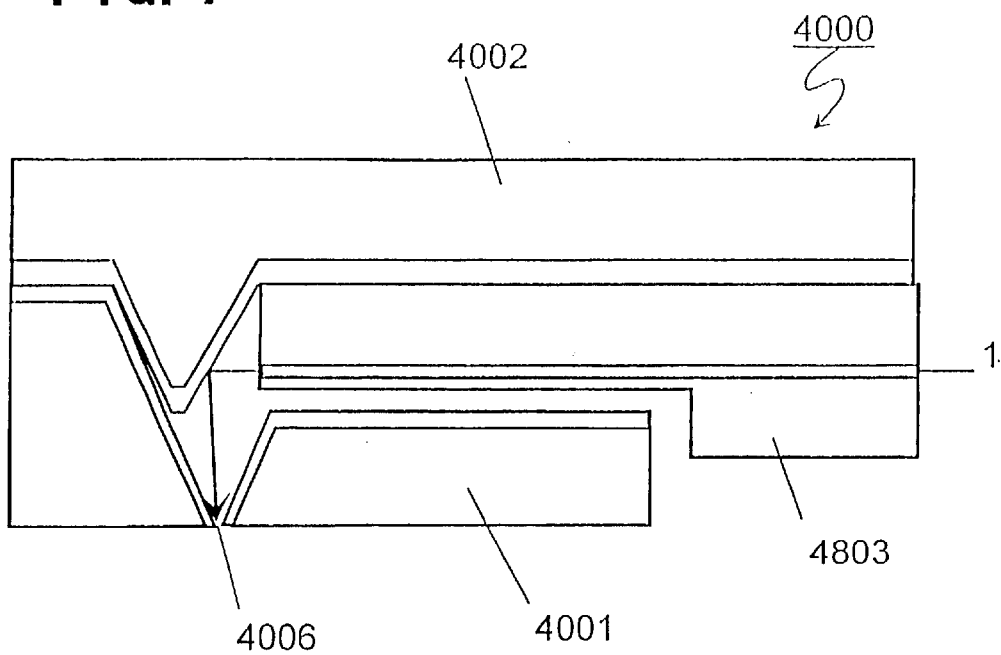
FIG. 7 is a construction view showing a near-field optical head according to the fourth embodiment of the present invention.

FIG. 7 is a construction view showing the near-field optical head 4000 related to the fourth embodiment of the present invention. The construction of the near-field optical head 4000 is approximately the same as the near-field optical head 1000 of the first embodiment of the present invention. The different point lies in that the optical fiber 4803 is fixed on the mirror part 4002.

The thickness T1 of the slider part 4001 is 10–50 μm. In the above-mentioned first embodiment, if the thickness T1 of the slider part 1001, for example, is quite small, there was a problem that the slider part 1001 might be deformed by the stress generated during period of bonding or joining process of the optical fiber 1803 to the slider part 1001. However, by adopting the structure of the near-field optical head 4000 according to the present embodiment, even though the slider part 4001 may be thin, the light can be irradiated in the minute aperture 4006 with stability without deformation. In addition, by means of making the slider part 4001 thin, the spatial propagating distance of the light generated from the optical fiber is shortened so that the near-field optical head 4000 of the present embodiment has a greater intensity than the near-field optical head 4001 shown in the fourth embodiment. In addition, by combining the present embodiment with the second or the third embodiment, it goes without saying that the intensity of the near-field light is increased to a greater extent.

Fifth Embodiment

Figure 9:
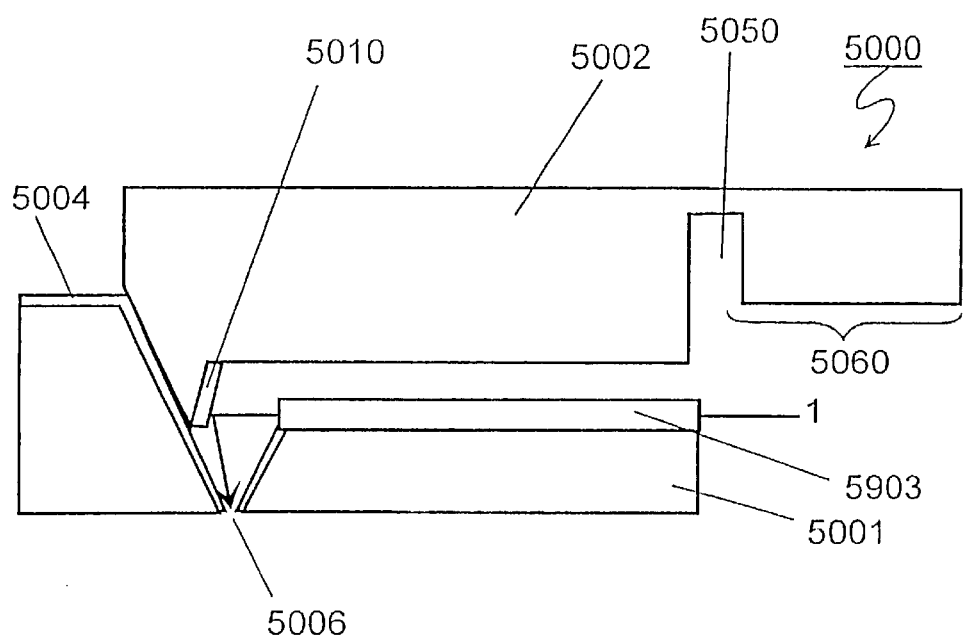
FIG. 9 is a construction view showing a near-field optical head according to the fifth embodiment of the present invention.

FIG. 9 is a construction view of the near-field optical head 5000 related to the fifth embodiment of the present invention. The near-field optical head 5000 consists of a slider part 5001 and a mirror part 5002. In the slider part 5001 is formed with a reverse cone-shaped hole 5005, the top of which is a minute aperture 5006. A reflection coating 5004 for effectively condensing the light incident into the hole 505 in the minute aperture 5006 is formed on the surface of the hole 5005. In addition, a V-shaped groove 5007 is formed in the slider part 5001 and in the bottom of the V-shaped groove is formed a plane on which is provided a waveguide 5903. The mirror part 5002 has a U-shaped groove 5008 like the mirror part 1002 of the first embodiment related to the present invention, a V-shaped groove 5060 for fixing the optical fiber which launches the light into the waveguide 5903, and a groove 5050 for facilitating the optical fiber being arranged near the waveguide 5903. Incidentally, optical components such as semiconductor laser or prism can be used alternatively as the means for launching the light into the waveguide 5903. In this case, the V-shaped groove 54 has a suitable construction to fix each optical component.

The dimensions of the slider part 5001 and the outside dimensions of the mirror part 5002 are approximately the same as the slider part 1001 and the mirror part 1002 of the first embodiment respectively. The waveguide 5903 is 500–4000 μm in length, 4–10 μm in thickness and 10–200 μm in width. The material of each component of the near-field optical head 5000 is approximately the same as that of the near-field optical head 1000 of the first embodiment. The material of the wave guide 5903 is a dielectric such as silicon dioxide or poly. The wave guide 5903 can either be a double layer construction consisted of a cladding layer and a core layer or a triple layer construction in which the core layer is sandwiched between the cladding layer or a construction in which all the circumferences of the core layer is covered with a cladding layer. V-shaped groove 5060 is 5–50 mm in length.

According to the above-mentioned near-field optical head 5000, the optical path of the light emitted from a waveguide is shortened because the light is propagated to the mirror 5010 by means of a waveguide 5903 formed in the neighborhood of the minute aperture. Therefore, the intensity of the near-field light generated from the minute aperture 5006 is increased. In addition, as the near-field optical head 5000 is a head that has an integral composition of the minute optical components such as prism, lens or semiconductor laser, the whole construction of the apparatus is made compact. By means of combining the present embodiment with the second embodiment, it goes without saying that the intensity of the near-field light generated from the minute aperture 5006 is increased to a greater extent.

The method for manufacturing the near-field optical head 5000 is described in below. The method for manufacturing the slider part 5001 is approximately the same as that of the slider part 1001 of the near-field optical head 1000 of the first embodiment. The different point lies in that there remains a forming process of a wave guide 5903 on the slider part 5001 after the process shown in FIG. 4f. The method for manufacturing the waveguide 5903 is as follows. At first, by means of gas phase synthesis method or a spin coating, a silicon dioxide or a poly is accumulated. Then, a masking for patterning the wave guide 5903 is formed and then the pattern of the wave guide 5903 is formed by means of dry etching such as reactive ion etching or plasma etching.

Next, the method of manufacturing the mirror part 5002 is approximately the same as that of the mirror part 1002 of the first embodiment. The different point lies in that there is a forming process of the V-shaped groove shown in FIG. 11 after the process shown in FIG. 3c.

Figure 11A:
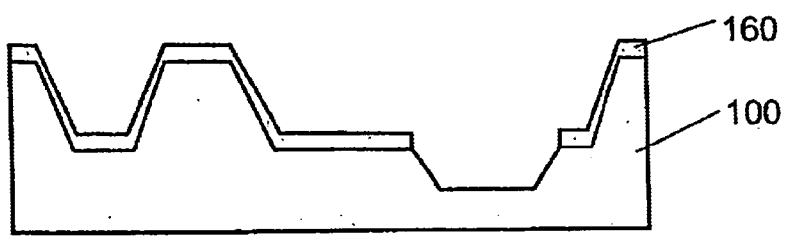
FIGS. 11(*a*)–11(*d*) show a method, in part, for manufacturing the mirror part of the near-field optical head according to the fifth embodiment of the present invention.

FIG. 11a shows a forming process of the V-shaped groove 5060, in which is illustrated a condition that the V-shaped groove has already been formed. After the process shown in FIG. 3c, the masking 101 for forming the U-shaped protrusion is removed. Then, the material for the masking 160 for forming the V-shaped groove 5060 is accumulated on the substrate 100 by an approach such as CVD, spin coating or sputtering. The material for the masking 160 is, for example, silicon dioxide, silicon nitride, amorphous silicon, titanium, chrome or etc. After the material for the masking 160 is accumulated, the masking 160 is formed by means of photolithography. The V-shaped groove is formed by means of a process such as wet etching by KOH or TMAH, active ion etching or the like.

Figure 11B:
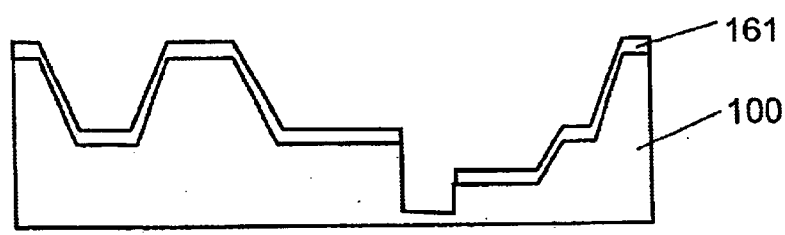

FIG. 11b shows the forming process of a recess 5050 for facilitating the fiber or the optical components to place near the waveguide, in which is illustrated a condition that the recess 5050 has already been formed. After the V-shaped groove is formed, the masking 160 is removed and the material for the making 161 for making a recess is provided on the substrate 100 by sputtering, vacuum deposition or spin coating. The material for the masking 161 is, for example, a metal such as aluminum, titanium or a dielectric such as silicon dioxide or photoresist. After the material for the masking 161 is accumulated, the masking 161 is formed by means of photolithography. Then, the recess is made by means of dry etching such as reactive ion etching or plasma etching or wet etching using a liquid mixture of hydrofluoric acid and nitric acid.

Figure 11C:
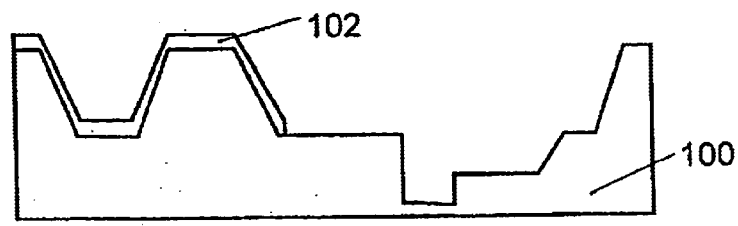

FIG. 11c shows a forming process of the reflection coating 102 to be a U-shaped protrusion, in which is illustrated a condition that the reflection coating 102 has already been coated. After the recess is formed, masking 161 is removed and the material for the reflection coating 102 is accumulated on the substrate 100 by means of an approach such as sputtering, vacuum deposition or plating. The material for the reflection coating 102 is, for example, aluminum or chrome with gold accumulated thereon, or titanium. After the material for the reflection coating 102 is accumulated, the reflection coating 102 undergoes patterning by means of photolithography. However, the patterning of the reflection coating 102 can be omitted when the size of the V-shaped groove was decided in consideration of the thickness of the reflection coating 102.

Figure 11D:
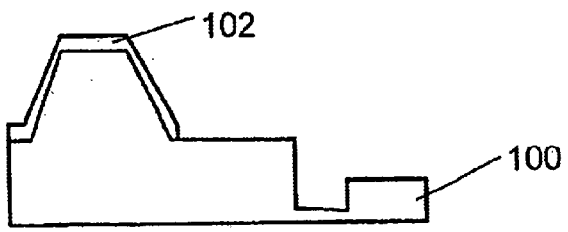

FIG. 11d shows a configuration process of the mirror part 5002, in which is illustrated a condition that the mirror part 5002 has already been cut out. After having performed the patterning of the reflection coating 102, the contour of the mirror part 5002 is formed by means of dicing or scribing or anisotropic etching by KOH or TMAH.

Sixth Embodiment

Figure 8:
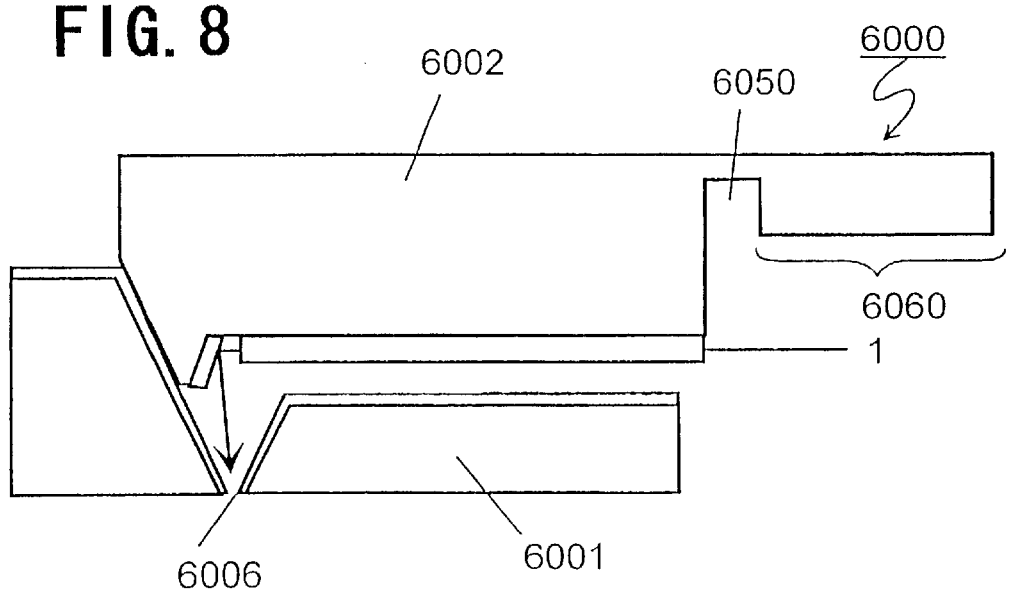
FIG. 8 is a construction view showing a near-field optical head according to the sixth embodiment of the present invention.

FIG. 8 is a construction view of a near-field optical head 6000 related to the sixth embodiment of the present invention. The near-field optical head 6000 consists of a slider part 6001 and a mirror part 6002. The slider part 6001 has the same construction as the slider part 2001 of the second embodiment of the present invention. The mirror part 6002 has in its U-shaped protrusion like the mirror part 2002 of the second embodiment of the present invention a waveguide 6003, V-shaped groove 6060 for fixing the optical fiber for launching light into the waveguide 6003 and a groove 6050 for facilitating the optical fiber to place near the waveguide 6003. Incidentally, the optical components such as semiconductor laser or prism can be used as means for launching light into the waveguide 6003. In this case, V-shaped groove 6060 has a suitable construction for fixing each optical component.

Dimensions of the slider part 6001 is approximately the same as the slider part 2001 of the second embodiment. The configuration of the mirror part 6002 is 1–5 mm in length, 1–60 mm in width and 200–500 mm in thickness. The waveguide 6003 is 500 μm–50 mm in length, 4–10 μm in thickness and 10–200 μm in width. The material of the each component of the near-field optical head 6000 is approximately the same as that of the near-field optical head 1000 of the first embodiment. The material of the waveguide 6003 is a dielectric such as silicon dioxide or poly. The wave guide 6003 can either be a double layer construction consisted of a cladding layer and a core layer or a triple layer construction in which the core layer is and sandwiched between the cladding layer or a construction in which all the circumferences of the core layer is covered with a cladding layer. The V-shaped groove 6060 is 5–50 mm in length.

According to the above-mentioned near-field optical head 6000, as the waveguide 6003 and the means for directing the light into the waveguide 6003 are formed integrally on the mirror part 6002, the alignment of the optical components is easier than that of the near-field optical head 5000 shown in the fifth embodiment and the each element has less displacement. Therefore, the optical head of the present embodiment can generate a near-field light having a more stable intensity than that generated by the fifth embodiment. In addition, as the heavy optical components such as optical head or semiconductor laser can be arranged at a position far from the minute aperture by means of increasing the length of the waveguide 6003, the positioning accuracy and the positioning speed can be improved. Furthermore, by means of constructing the mirror part 6002 as a suspension arm, the head and the suspension are made integral so that the manufacturing cost is reduced enabling a provision of cheap recording/reproducing head and suspension.

The method for manufacturing the near-field optical head 6000 is approximately the same as that of the near-field optical head related to the fifth embodiment. The different point lies in that there exists a forming process of the waveguide 6003 before the process shown in FIG. 11a. The method for forming the waveguide 6003 is as follows. At first, silicon dioxide or poly is accumulated by means of gas phase synthesis method or spin coating. Succeedingly, masking for patterning the waveguide 6003 is formed and then the pattern of the waveguide 6003 is formed by means of dry etching such as reactive ion etching or plasma etching.

Seventh Embodiment

Figure 10:
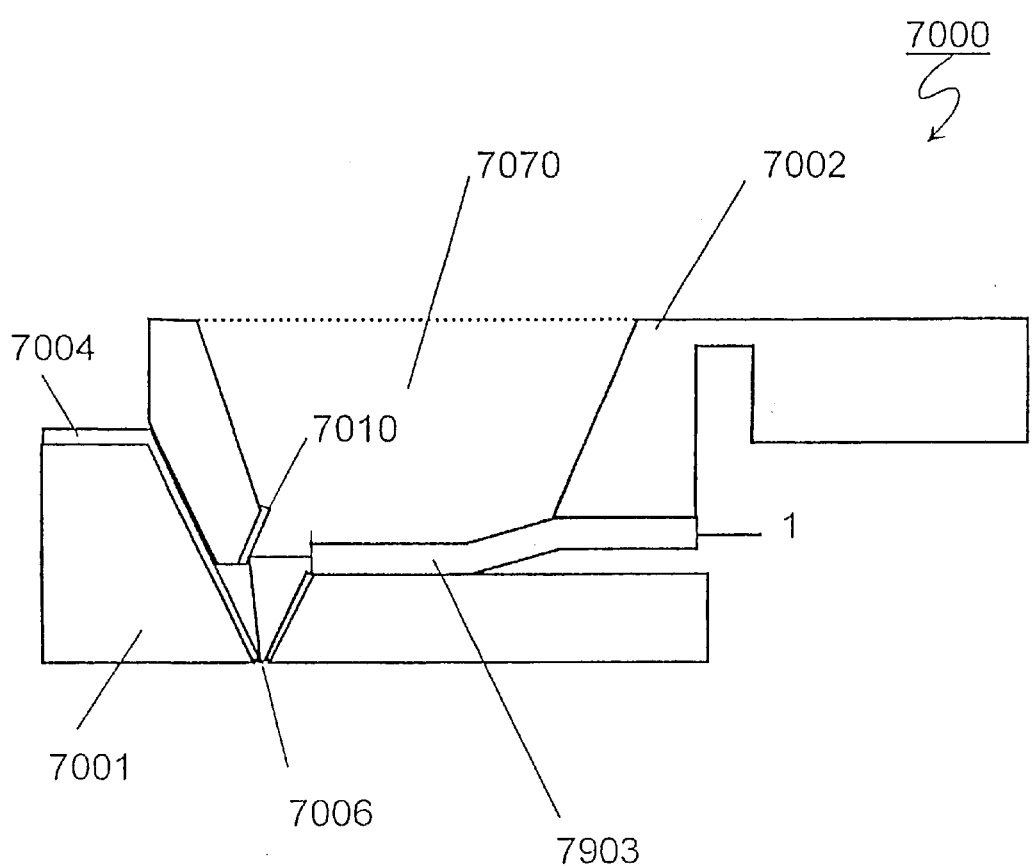
FIG. 10 is a construction view showing a near-field optical head according to the seventh embodiment of the present invention.

FIG. 10 is a construction view of the near-field optical head 7000 related to the seventh embodiment of the present invention. The construction of the near-field optical head 7000 is approximately the same as that of the near-field optical head shown in the sixth embodiment. The different point is that the light incident edge is fixed on the mirror part 7002 while the light emitting edge is fixed on the slider part 7001 and that a hole 7070 for pushing the waveguide 7903 is formed on the mirror part 7002.

Each size of the near-field optical head 7000 is approximately the same as that of the sixth embodiment. The size D70 of the hole 7070 is 1–4 mm. The wave guide 7903 can be a double layer construction of a cladding layer and a core layer or a triple layer construction in which the core layer is sandwiched by two cladding layers or a construction in which all the circumferences of the core layer is covered with a cladding layer.

According to the aforementioned near-field optical head 7000, as the light emitting edge of the waveguide 7903 is fixed on the slider part 7001, the distance between the light emitting edge of the waveguide 7903 and the minute aperture 7006 becomes shorter than that of the near-field optical head shown in the sixth embodiment. Therefore, the near-field optical head 7000 related to the present embodiment can generate near-field light having greater intensity than that generated by the near-field optical head related to the sixth embodiment.

The method of manufacturing the near-field optical head 7000 is approximately the same as that of the near-field optical head 6000 shown in the sixth embodiment. The different point is that there exists a forming process of a hole 7070 for pushing the waveguide after the forming process of the waveguide 7903. The hole 7070 is formed as explained below. At first, a masking for providing a hole 7070 on the substrate 100 at a side opposite to the side provided with the U-shaped protrusion is formed after the process shown in FIG. 11c. Afterwards, the hole 7070 is formed by means of anisotropic etching such as TMAH or KOH.

Eighth Embodiment

Figure 12:
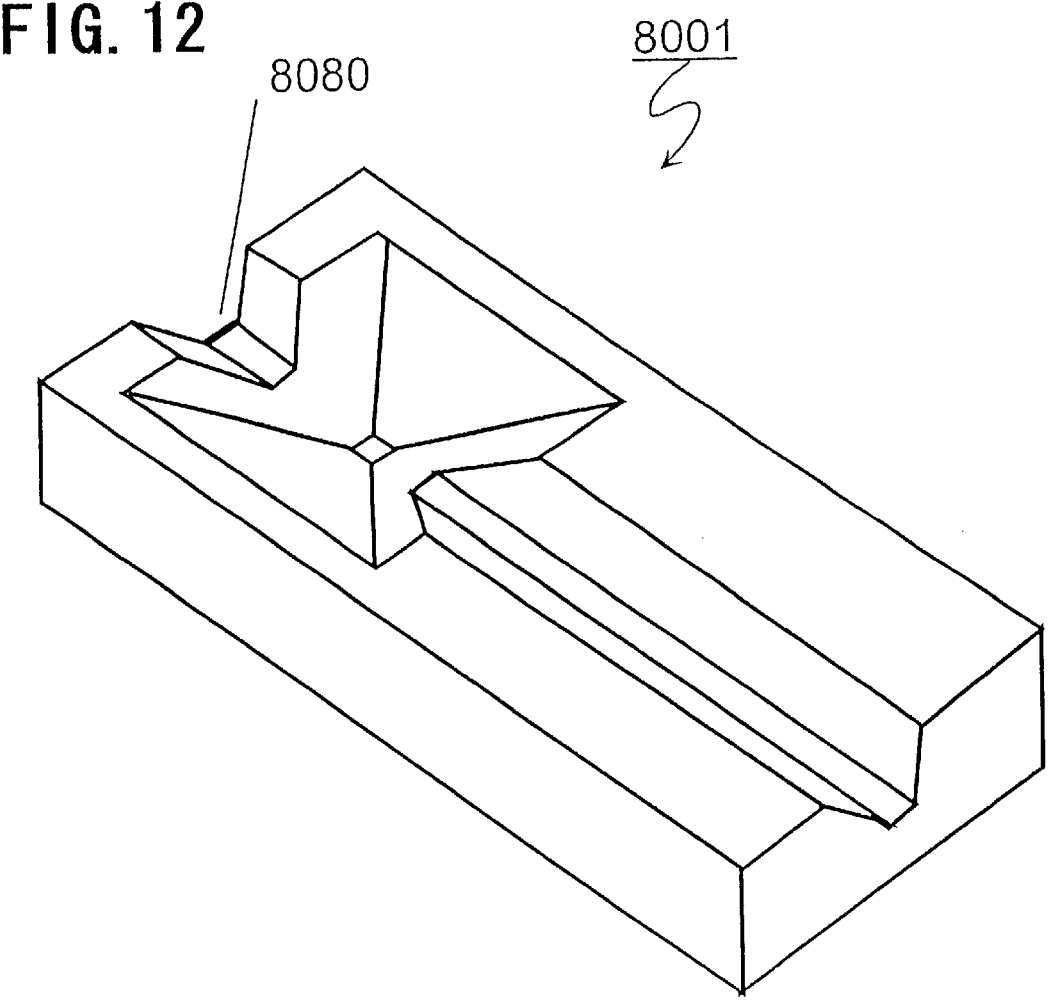
FIG. 12 is a perspective view showing a slider part of the near-field optical head according to the eighth embodiment of the present invention.
Figure 13:
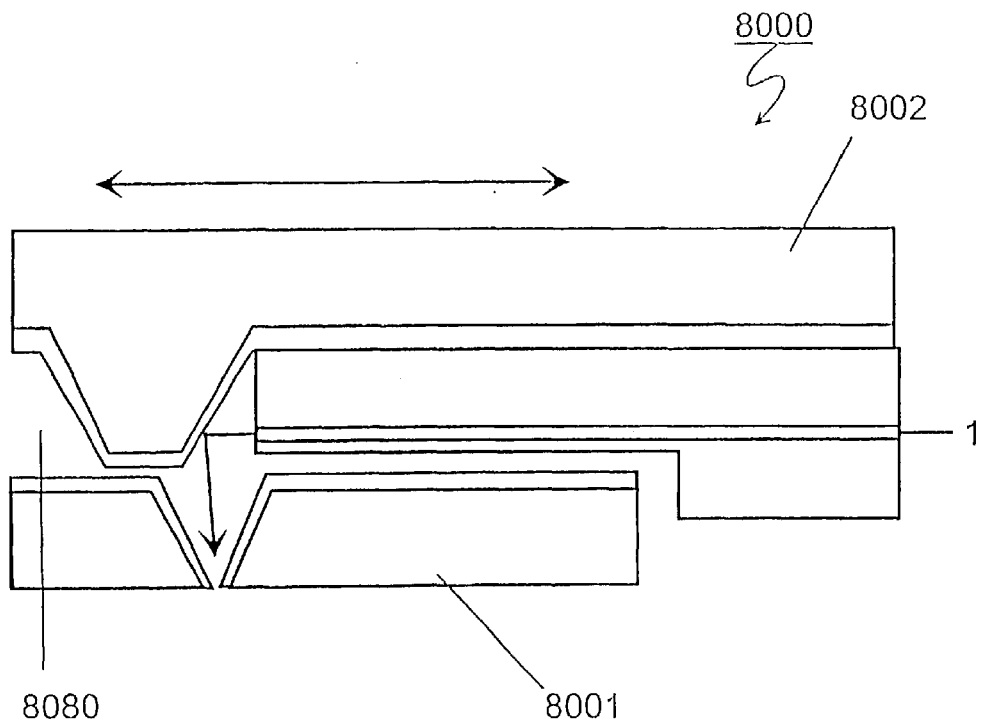
FIG. 13 is a construction view showing a slider part of the near-field optical head according to the eighth embodiment of the present invention.

FIG. 13 is a construction view of the near-field optical head 8000 related to the eighth embodiment of the present invention. In addition, FIG. 12 is a perspective view of the slider part 8001 of the near-field optical head 8000. The construction of the near-field optical head 8000 is approximately the same as the first embodiment of the present invention. The different point is that it has a mirror alignment margin 8080. As the position of the mirror part can be finely adjusted along the direction of the V-shaped groove formed in the slider part 8001 by means of the mirror alignment margin 8080, a near-field optical head capable of generating near-field light of great intensity is provided.

Ninth Embodiment

Figure 14:
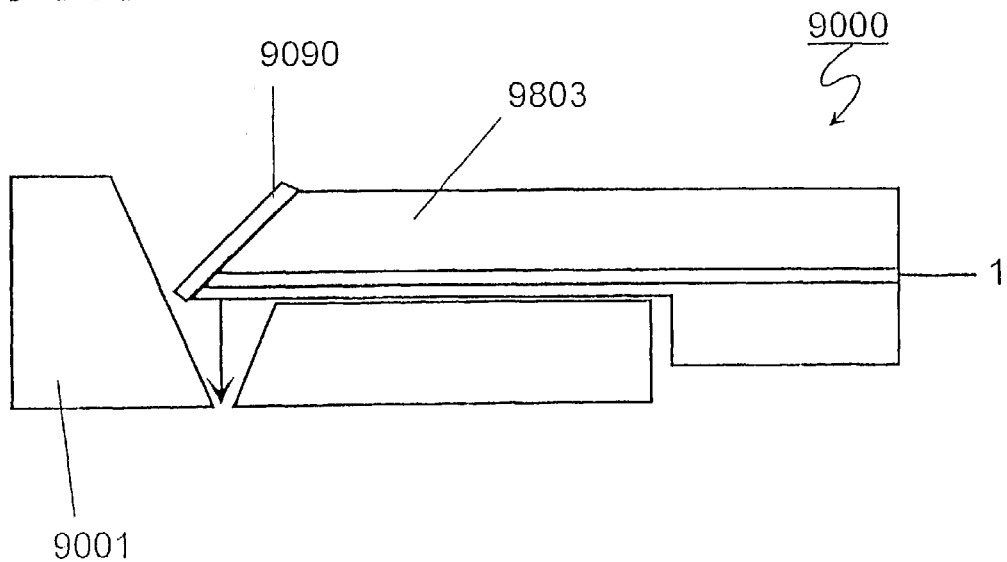
FIG. 14 is a construction view showing a slider part of the near-field optical head according to the ninth embodiment of the present invention.

FIG. 14 is a construction view of the near-field optical head 9000 related to the ninth embodiment of the present invention. The near-field optical head 9000 consists of a slider part 9001 and an optical fiber 9803 equipped with mirror and a mirror 9090. The slider part 9001 is approximately the same as the slider part 9001 of the first embodiment. The construction of the optical fiber 9803 equipped with mirror is approximately the same as that of the optical fiber 1003 shown in the first embodiment. The different point is that the tip of the optical fiber is ground and the mirror 9090 is formed on the ground surface. According to the near-field optical head 9000 of the above structure, not only because of the effects described in the first embodiment but also because the number of the components are less than that of the first embodiment, the assembly becomes easy.

Tenth Embodiment

FIG. 16 is a construction view of the near-field optical head 10000 related to the tenth embodiment of the present invention. FIG. 16b is a sectional drawing of the near-field optical head 10000 and FIG. 16b is a sectional drawing of the near-field optical head 10000 at a position shown by a line 16b–16b' in FIG. 16a. The near-field optical head 10000 comprises a slider part 10001, a mirror part 10002 and a light waveguide 10903. The slider part 10001 is formed a reverse cone-shaped hole 10005, the opt of which is a minute aperture 10006. A reflection coating 10004 is formed on the surface of the hole 10005. On the other hand, the mirror part 10002 is formed with a down step, the slope of which is a mirror 10010. Light waveguide 10903 is a shape of square pole and ac ore 10011 for propagating light is maldistributed on the slider part 10001 side.

The light 1 launched into the light waveguide 10903 is propagated through the light waveguide 10903 and emitted from the end face of the mirror 10010 side. The emitted light is reflected back by the mirror 10010 to enter into the hole 10005 and condensed into the minute aperture 10006 effectively by the reflection coating 10004. Therefore, as the core 10011 of the light waveguide 10903 is maldistributed on the slider side, the length of the optical path from the emitting edge of the light waveguide 10903 to the minute aperture 10006 can be shortened.

Figure 18:
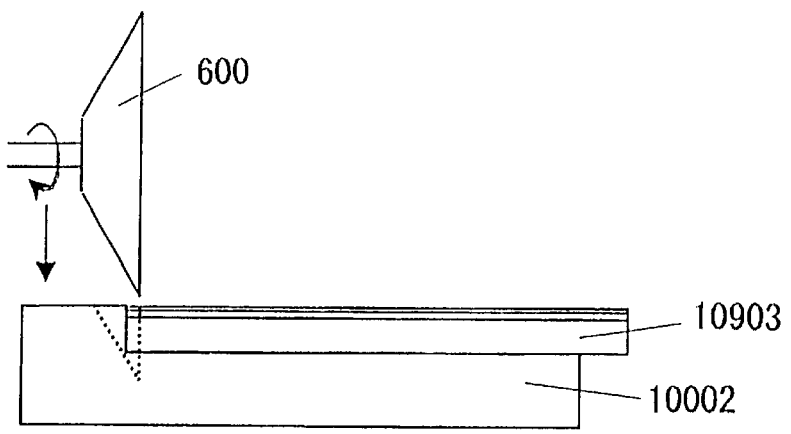
FIG. 18 is a construction view showing a method for manufacturing the mirror part and the light waveguide of the near-field optical head according to the tenth embodiment of the present invention.

As for the method of manufacturing the near-field optical head of the present invention, the mirror 10010 and the light emitting edge of the light waveguide 10903 is formed by means of grinding with the cone-shaped blade 600 as shown in FIG. 18 after the light waveguide 10903 was made on the lower side (down step side) of the mirror part 10002. Then, it is joined or bonded together with the slider part 10001. Incidentally, it may also be possible to join or bond the light waveguide 10903 with the mirror part 10002 to perform a similar grinding after the light waveguide 10903 was made separately.

Furthermore, the near-field optical head 10000 of the present embodiment has following advantages in comparison with the construction having a ground optical fiber such as the near-field optical head 1000 of the aforementioned first embodiment. In any of the near-field optical head of the present invention, since the minute aperture has to be placed close to the recording medium, the recording medium side of the structural member (such as for example the slider part) having a minute aperture must be set nearer to the recording medium than the recording medium side of the light propagating medium to be connected. Therefore, when providing the head by means of grinding the optical head like aforementioned near-field optical head 1000, the slider part has a structure having a greater thickness than the cladding of the recording medium side of the light propagating medium. As shown in FIG. 17, in case of the slider part having a slim structure, the part 2 (the light propagating medium and the recording medium 10504) indicated by dotted line interferes physically. However, it is necessary to make the distance between the recording medium and the minute aperture and also the distance between the light emitting edge of the light propagating medium and the minute aperture as small -as possible in order to provide near-field light having a greater intensity. Thus, as the near-field optical head 10000 has a core maldistributed on the slider part namely the recording medium side, the thickness of the cladding and also the thickness of the slider part can be made small. Therefore, the minute aperture and the recording medium can be arranged close to each other and at the same time a construction is provided in which the length of the optical path between the light emitting edge of the waveguide and the minute aperture can be shortened to a greater extent.

As for the material of the slider part 10001, a dielectric such as silicon or quartz or a metal such as stainless steel or copper, in particular material of a high reflectance with grinding facility is desirable. The material of the reflection coating 10004 is a metal having high reflectance such as aluminum or gold or dielectric multilayer film. As for the material of the light waveguide 10903, a formation is possible with polymeric materials represented by silicon oxide (glass) or UV hardening resin. Consequently, as for the light waveguide 10903, the optimum materials can be chosen according to the propagation characteristics and the intensity of the light or the method for manufacturing the optical head.

Figure 19:
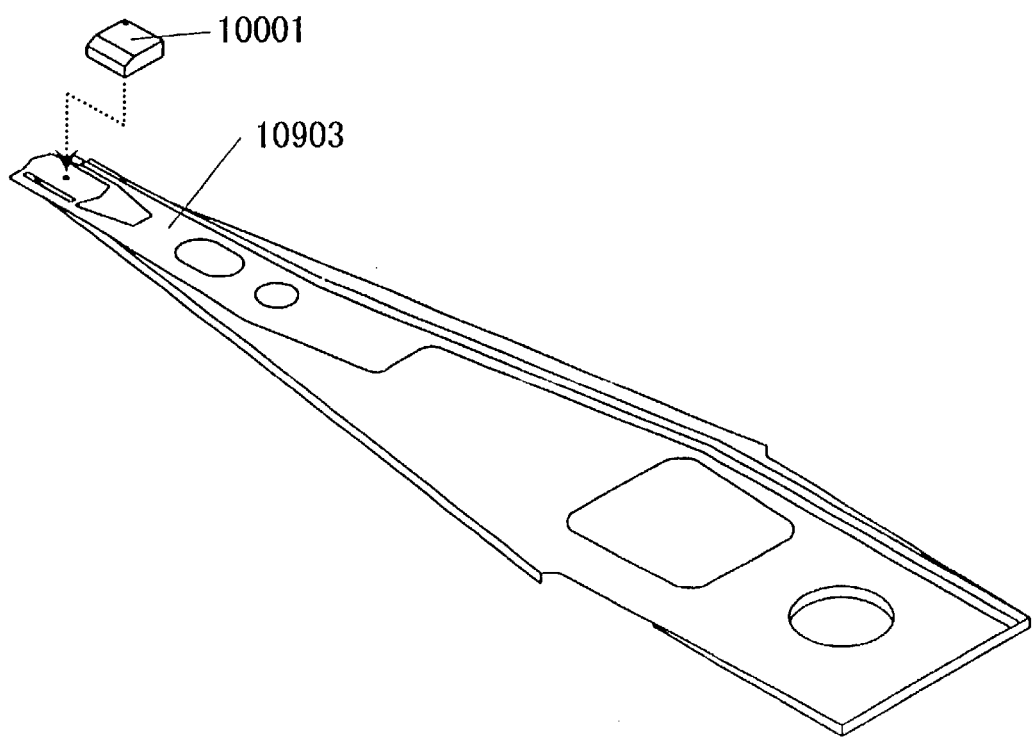
FIG. 19 is a construction view showing a near-field optical head according to the tenth embodiment of the present invention.

In addition, FIG. 19 is a construction view of the near-field optical head 10000 held by suspension arm. Here, the light waveguide 10903 acts also as a part of the suspension arm for holding the slider part 10001 and the mirror part 10002 (not shown). Incidentally, the whole suspension arm can be made of light waveguide.

As described above, according to the near-field optical head 1000 of the tenth embodiment, since the core of the light waveguide 10903 is maldistributed, the distance between the light emitting edge of the light waveguide 10903 and the minute aperture 10006 is shortened so that the spot diameter of the emitting light at the minute aperture 10006 is reduced. Therefore, the intensity of the near-field light emitted from the minute aperture 10006 can be increased. Furthermore, as it is constructed such that the light waveguide 10903 and the recording medium do not interfere physically to each other, the length of the optical path between the light emitting edge and the minute aperture can be shortened to a greater extent. In addition, by adding a function of suspension to the light waveguide 10903, the near-field optical head can be manufactured more easily.

Eleventh Embodiment

Figure 20:
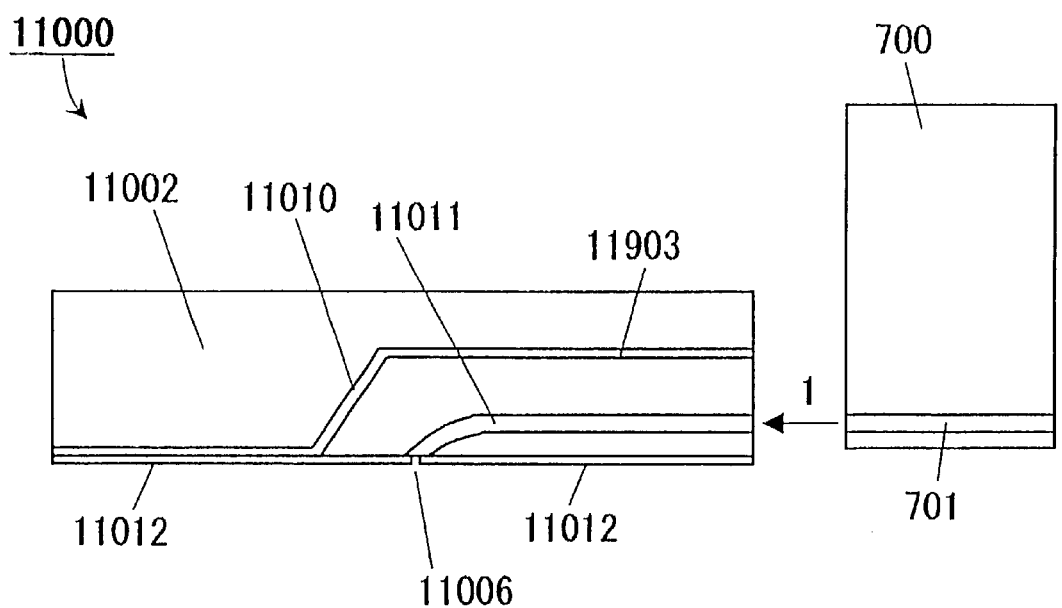
FIG. 20 is a construction view showing a near-field optical head according to the eleventh embodiment of the present invention.

FIG. 20 is a construction view of the near-field optical head 11000 related to the eleventh embodiment of the present invention. The near-field optical head 11000 comprises a mirror part 11002, a light waveguide having maldistributed core 11903 and a shading film 11012 layered on the surface of the light waveguide 11903. A minute aperture 11006 is provided on the shading film 11012. The light 1 launched into the light waveguide having maldistributed core 11903 is propagated along the curvature of the core part 11011 in the light waveguide having a maldistributed core 11903. Because the light 1 is introduced directly to the minute aperture 11006, a near-field light having a great intensity can be generated. Incidentally, by means of reducing the radius of the curvature of the core part 11011, a construction may also be possible in which the straight by traveling light deviated from the core part 11011 is reflected back by the mirror 11010 formed on the mirror part 11002 to be launched into the minute aperture 11006.

In addition, for the light incident in the near-field optical head 11000 of the embodiment related to the present invention, a light waveguide or an optical fiber 700 having a maldistributed core is effective. This light waveguide or the optical fiber 700 has a core 701 maldistributed on the recording medium side. This is because of the reason mentioned in the above-described tenth embodiment namely that the physical interference between the recording medium and the light waveguide or the optical fiber 700 can be avoided and that the length of the optical path to the minute aperture can be shortened owing to the maldistribution of the core part of the light waveguide having maldistributed core 11903 on the recording medium side.

As for the manufacturing method, the same process as the aforementioned first embodiment shown in FIG. 3 is performed. A light waveguide 11903 is provided by layering three or more layers of silicon oxide or the like in the groove afterwards. The upper side (the recording medium side namely the side to be formed with the minute aperture) of the light waveguide is ground into a flat plane on which a shading film 11012 is layered and at last the minute aperture 11006 is formed by FIB etc. Incidentally, the position for forming the minute aperture differs according to the case whether the light travels along the core part 11011 of the light waveguide or travels straight deviating from the core.

According to this structure, the minute aperture 11006 is provided directly on the surface of the light waveguide 11903 so that the distance between the incident light and the minute aperture 11006 can be shortened further. Therefore, it is made possible to generate the near-field light of great intensity with stability.

INDUSTRIAL APPLICABILITY

As described above, the first near-field optical head according to the present invention, the mirror position is arranged in the vicinity of the minute structure and also the light emitting edge position of the light propagating medium is arranged nearer to the minute structure by means of the optical path shortening structure so that the length between the light emitting edge of the light propagating medium and the minute structure can be shortened and the spot diameter of the light emitted from the light propagating medium at the position of the minute structure can be reduced, resulting in that the intensity of the near-field light emitted from the minute structure is made great. Therefore, a near-field optical head capable of high-density recording and reproducing can be provided.

Further, according to the second near-field optical head related to the present invention, in addition to the effects of the first near-field optical head, high-density recording and reproducing is made possible because the spot diameter of the near-field light on the reproducing medium can be reduced to approximately the same size as the minute aperture.

Further, according to the third near-field optical head related to the present invention, in addition to the effects of the first and the second near-field optical head, a near-field optical head for generating a near-field light with stable intensity can be provided because the aforementioned light propagating medium can be fixed easily by means of providing the light propagating medium in the groove.

Further, according to the fourth near-field optical head related to the present invention, in addition to the effects of the first to the third near-field optical head, a stable optical system can be composed and the intensity of the near-field light generated by the minute structure is made stable.

Further, according to the fifth near-field optical head related to the present invention, in addition to the effects of the first to the third near-field optical head, the adjustment of the optical axis is simplified because the mirror and the light propagating medium both of which are the components of the optical head can be provided integrally so that the adjustment of the optical axis becomes unnecessary. Furthermore, a cheap near-field optical head can be provided because the number of the components is reduced so that the unit cost of the head is lowered.

Further, according to the sixth or the seventh near-field optical head related to the present invention, in addition to the effects of the first to the fifth near-field optical head, the intensity of the near-field light emitted from the minute structure is increased because the energy density of the near-field light at the minute structure can be increased.

Further, according to the eighth near-field optical head related to the present invention, in addition to the effects of the fourth and the sixth to the seventh near-field optical head, the optical adjustment for maximizing the intensity of the near-field light emitted from the minute structure becomes easy.

Further, according to the 9th near-field optical head related to the present invention, the intensity of the near-field light generated from the minute structure is increased because, in addition to the 4th and 6th through 8th effects of the near-field optical head, the light is launched on the light propagating medium effectively.

Further, according to the tenth near-field optical head related to the present invention, in addition to the effects of the first to the ninth near-field optical head, the intensity of the near-field light emitted from the minute structure can be stabilized because the position of the light propagating medium can be settled by means of fixing or forming the light propagating medium on the slider.

Further, according to the eleventh near-field optical head related to the present invention, in addition to the effects of the fourth to the ninth near-field optical head, the position of the light propagating medium can be stabilized even if a slider of small thickness is used. Furthermore, the intensity of the near-field light generated from the minute structure is increased because the distance between the light propagating medium and the minute structure can be shortened with the use of the slider of small thickness.

Further, according to the twelfth near-field optical head related to the present invention, in addition to the effects of the sixth to the ninth near-field optical head, the intensity of the near-field light emitted from the minute structure can be increased further because the positioning accuracy of the light incident edge of the light propagating medium and the groove or the protrusion for fixing the optical components for launching the light into the light propagating medium is satisfactory and the light emitting edge of the light propagating medium can be arranged close to the minute structure.

Further, according to the thirteenth near-field optical head related to the present invention, in addition to the effects of the first to the twelfth near-field optical head, the spot diameter of the light emitted from the light emitting edge of the optical fiber in the minute structure can be reduced because the light emitting edge of the optical fiber can be arranged closer to the mirror. Therefore, the intensity of the near-field light generated from the minute structure can be increased.

Further, according to the fourteenth near-field optical head related to the present invention, in addition to the effects of the first to the twelfth near-field optical head, the mass of the near-field optical head can be reduced by means of using a thin film waveguide thinner and lighter than the optical fiber as a light propagating medium. Therefore, it is easy to improve the positioning accuracy and the positioning speed of the near-field optical head. In addition, with the use of thin film waveguide as a light propagating medium, the thickness of the near-field optical head is easy to be reduced and the construction of the apparatus is made compact to a greater degree.

Further, according to the first to the seventh method of manufacturing the near-field optical head related to the present invention, it is made possible to produce the near-field optical head related to the present invention with ease and in a large quantity.

Further, according to the fifteenth near-field optical head related to the present invention, the light emitting edge can be made at the optimal position for the optical condition varying in accordance with the structure of the slider because the light emitting edge of the light propagating medium can be set at any position of the slider. Therefore, the intensity of the light launched into the minute aperture can be increased to a greater extent.

Further, according to the sixteenth near-field optical head related to the present invention, it is made possible to increase the intensity of the generated near-field light because the distance between the light emitting edge and the minute aperture is shortened by means of maldistributing the core part for propagating the light in the light propagating medium on the recording medium side. Furthermore, the physical interference between the light propagating medium and the recording medium can be avoided due to the structure of the head in itself because the distance between the core part of the light propagating medium and the recording medium is also shortened.

Further, according to the seventeenth and the eighteenth near-field optical head related to the present invention, it is made possible to increase and stabilize the intensity of the near-field light emitted from the minute aperture because the evasion of the connection with the light propagating medium and the stable provision of the light propagating medium becomes possible.

Further, as the number of the components is reduced, it is made possible to decrease the work amount in the assembly process and to improve the assembling accuracy enabling the production in a large quantity with stability.

What is claimed is:

1. A near-field optical head comprising:
   a slider supported by a suspension arm for exerting a load, receiving a floating force due to relative movement with a recording medium, and forming a gap between the slider and the recording medium through a balance between the load and the floating force;
   a means defining a minute aperture for emitting near-field light and formed on the recording medium side of the slider, the minute aperture having a diameter equal to or less than a wavelength of visible light;
   a light propagating medium disposed on a surface of the slider opposite to the recording medium side generally in parallel with the suspension arm;
   a mirror disposed generally above the minute aperture for guiding light emitted from the light propagating medium to the minute aperture; and
   an optical path shortening structure for shortening an optical path length between an output end of the light propagating medium and the minute aperture.

2. A near-field optical head according to claim 1; wherein the optical path shortening structure comprises a groove formed in the vicinity of the minute aperture; and
   wherein the light propagating medium is disposed in the groove.

3. A near-field optical head according to claim 2; wherein the mirror is disposed on and is integral with a substrate disposed above the slider.

4. A near-field optical head according to claim 2; wherein the mirror is formed on the light propagating medium.

5. A near-field optical head according to claim 4; wherein the mirror is generally concave-shaped for condensing the light emitted from the light propagating medium.

6. A near-field optical head according to claim 5; wherein the light propagating body generally concave-shaped mirror has a lens function for condensing light on a tip of the light propagating medium.

7. A near-field optical head according to claim 1; wherein the diameter of the minute aperture is 300 nm or less.

8. A near-field optical head according to claim 1; wherein the diameter of the minute aperture is 100 nm.

9. A near-field optical head according to claim 1; wherein the diameter of the minute aperture is in the range of 50–300 nm.

10. A near-field optical head comprising:
   a slider supported by a suspension arm for exerting a load, receiving a floating force due to relative movement with a recording medium and forming a gap between the slider and the recording medium through a balance between the load and the floating force;
   a microstructure formed on the recording medium side of the slider;
   a light propagating medium disposed on a surface of the slider opposite to the recording medium side generally in parallel with the suspension arm;
   a mirror formed on the light propagating medium and disposed generally above the microstructure for guiding light emitted from the light propagating medium to the microstructure, the mirror being generally concave-shaped and having a lens function for condensing light emitted from the light propagating medium on a tip of the light propagating medium; and
   a mirror alignment mechanism formed on the slider and/or the substrate for setting a position of the mirror and the microstructure.

11. A near-field optical head according to claim 10; further comprising an optical component for directing light into the light propagating medium and being supported in a groove or by a protrusion formed in the substrate.

12. A near-field optical head according to claim 11; wherein the light propagating medium is formed on the slider.

13. A near-field optical head according to claim 11; wherein the light propagating medium is formed on a side of the slider on which the mirror is disposed.

14. A near-field optical head according to claim 11; wherein the light propagating medium has an input end connected to the substrate and the output end connected to the slider.

15. A near-field optical head according to claim 14; wherein the light propagating medium comprises an optical fiber having an optical axis and a tip disposed generally parallel to the optical axis.

16. A near-field optical head according to claim 14; wherein the light propagating medium comprises a light waveguide.

17. A method for manufacturing a near-field optical head, comprising the steps of: forming a mirror by forming a protrusion on a substrate and forming a reflection film on the protrusion; forming a slider by forming a hole in a substrate, forming at a terminal end of the hole a minute aperture for emitting near-field light and having a diameter equal to or less than a wavelength of visible light, forming an optical path shortening structure in the substrate in communication with the minute aperture, and forming a reflection coating on a surface of the hole; and disposing the mirror over the slider.

18. A method for manufacturing a near-field optical head according to claim 17; further comprising the step of connecting an optical fiber on the slider or the mirror before the disposing step.

19. A method for manufacturing a near-field optical head according to claim 17; further comprising the step of forming a thin film waveguide on one of the slider or the mirror before the disposing step.

20. A method for manufacturing a near-field optical head according to claim 19; wherein the step of forming a mirror further comprises the step of forming a groove or a protrusion in the substrate for supporting optical components.

21. A method for manufacturing a near-field optical head according to claim 18; further comprising the step of grinding a tip of the optical fiber to sharpen the tip and so that the tip is parallel with an optical axis of the optical fiber.

22. A method for manufacturing a near-field optical head according to claim 18; further comprising the step of shaping a tip of the optical fiber to form a surface extending along a plane inclined to an optical axis of the optical fiber probe; and forming a reflection coating on the surface of the tip of the optical fiber probe.

23. A method for manufacturing a near-field optical head according to claim 22; further comprising the step of machining the tip of the optical fiber to form a lens for condensing light emitted from the optical fiber onto the minute aperture.

24. A method according to claim 17; wherein the diameter of the minute aperture is 300 nm or less.

25. A method according to claim 17; wherein the diameter of the minute aperture is 100 nm.

26. A method according to claim 15; wherein the diameter of the minute aperture is in the range of 50–300 nm.

27. A near-field optical head comprising:
   a light propagating medium for emitting light;
   a mirror for reflecting the light emitted from the light propagating medium;
   means defining a minute aperture for emitting near-field light and arranged in the direction of the light reflected by the mirror for receiving the reflected light, the minute aperture having a diameter equal to or less than a wavelength of visible light; and
   a slider having a suspension arm for supporting the light propagating medium, the mirror, and the minute aperture, exerting a load, receiving a floating force due to relative movement with a recording medium, and forming a gap between the minute aperture and the recording medium through a balance between the load and the floating force.

28. A near-field optical head according to claim 27; wherein the light propagating medium has a core portion for propagating light and extending toward the recording medium.

29. A near-field optical head according to claim 27; wherein the light propagating medium comprises at least a part of the suspension arm.

30. A near-field optical head according to claim 29; wherein the mirror is disposed on and is integral with a substrate disposed above the slider.

31. A near-field optical head according to claim 27; wherein the diameter of the minute aperture is 300 nm or less.

32. A near-field optical head according to claim 27; wherein the diameter of the minute aperture is 100 nm.

33. A near-field optical head according to claim 27; wherein the diameter of the minute aperture is in the range of 50–300 nm.

34. A near-field optical head comprising:
   a slider supported by a suspension arm for exerting a load, receiving a floating force due to relative movement with a recording medium, and forming a gap between the slider and the recording medium through a balance between the load and the floating force, the slider having a minute aperture for emitting near-field light, the minute aperture having a diameter equal to or less than a wavelength of visible light;

a light propagating medium having an output end for emitting light;

optical path length shortening means for shortening an optical path length between the output end of the light propagating medium and the minute aperture; and a mirror disposed over the slider for guiding light emitted from the light propagating medium to the minute aperture of the slider.

35. A near-field optical head according to claim 34; wherein the slider has a groove; and wherein the mirror has a protrusion disposed in the groove of the slider to define the optical path length shortening means.

36. A near-field optical head according to claim 34; wherein the groove of the slider is generally V-shaped and the protrusion of the mirror is generally U-shaped.

37. A near-field optical head according to claim 34; wherein the light propagating medium comprises an optical fiber having an optical axis and a tip portion extending generally parallel to the optical axis.

38. A near-field optical head according to claim 37; wherein the optical fiber is disposed generally parallel to the suspension arm.

39. A near-field optical head according to claim 34; wherein the light propagating medium is disposed generally parallel to the suspension arm.

40. A near-field optical head according to claim 34; wherein the diameter of the minute aperture is 300 nm or less.

41. A near-field optical head according to claim 34; wherein the diameter of the minute aperture is 100 nm.

42. A near-field optical head according to claim 34; wherein the diameter of the minute aperture is in the range of 50–300 nm.

* * * * *